US012647704B2

(12) United States Patent
Zhang et al.

(10) Patent No.: US 12,647,704 B2
(45) Date of Patent: Jun. 2, 2026

(54) OPTICAL BUS COMMUNICATION METHOD AND SYSTEM, DEVICE, AND MEDIUM

(71) Applicant: HUAWEI TECHNOLOGIES CO., LTD., Shenzhen (CN)

(72) Inventors: Lun Zhang, Dongguan (CN); Jun Luo, Dongguan (CN); Su Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 18/455,613

(22) Filed: Aug. 24, 2023

(65) Prior Publication Data

US 2023/0403488 A1    Dec. 14, 2023

Related U.S. Application Data

(63) Continuation of application No. PCT/CN2021/125212, filed on Oct. 21, 2021.

(30) Foreign Application Priority Data

Feb. 26, 2021    (CN) ......................... 202110217060.9

(51) Int. Cl.
    *H04Q 11/00*        (2006.01)
(52) U.S. Cl.
    CPC . *H04Q 11/0067* (2013.01); *H04Q 2011/0083* (2013.01)
(58) Field of Classification Search
    CPC .................................................. H04Q 11/0067
    See application file for complete search history.

(56) References Cited

U.S. PATENT DOCUMENTS

| | | | | |
|---|---|---|---|---|
| 9,350,111 | B1 * | 5/2016 | Dyer ................... | H04L 12/2878 |
| 2019/0297095 | A1 * | 9/2019 | Formby ............. | H04L 63/0227 |
| 2022/0058265 | A1 * | 2/2022 | Staples ................ | G06F 21/566 |

FOREIGN PATENT DOCUMENTS

CN          109100989 A     12/2018

OTHER PUBLICATIONS

IEEE Standard for Ethernet Amendment 5: Specification and Management Parameters for Interspersing Express Traffic.IEEE Std 802.3br-2016. Oct. 14, 2016, total 58 pages.

(Continued)

*Primary Examiner* — Shi K Li

(57)        ABSTRACT

Embodiments of this application disclose an optical bus communication method, including: A first terminal obtains first control information from a controller, where the first control information is generated by the controller and is used to control an execution mechanism to work. The first terminal sends the first control information to a central office over a first section, so that the central office forwards the first control information to a second terminal, where the second terminal is connected to the execution mechanism. The first terminal obtains first state information from the central office, where the first state information is used to record a working state of the execution mechanism, the first state information is information sent by the second terminal to the central office over a second section after the second terminal obtains the first control information, and the first section does not overlap with the second section.

10 Claims, 10 Drawing Sheets

(56) References Cited

OTHER PUBLICATIONS

IEEE Standard for a Precision Clock Synchronization Protocol for Networked Measurement and Control Systems. IEEE Instrumentation and Measurement Society. IEEE Std 1588-2019. Jun. 16, 2020, total 499 pages.

Gao Junli et al: "Study on the high speed communication system for automation equipments", Future Computer and Communication (ICFCC), 2010 2nd International Conference on, IEEE, Piscataway, NJ, USA, May 21, 2010 (May 21, 2010), pp. V2-628, XP031698948, total 4 pages.

Richard Goodson Adtran USA: "Draft new Recommendation ITU-T G.XGS-PON (for Consent, Feb. 26, 2016); TD523 Rev.1 (PLEN/ 15)", ITU-T Draft; Study Period 2013-2016, International Telecommunication Union, Geneva; CH, vol. 2/15, Mar. 13, 2016 (Mar. 13, 2016), pp. 1-300, XP044166299, total 300 pages.

* cited by examiner

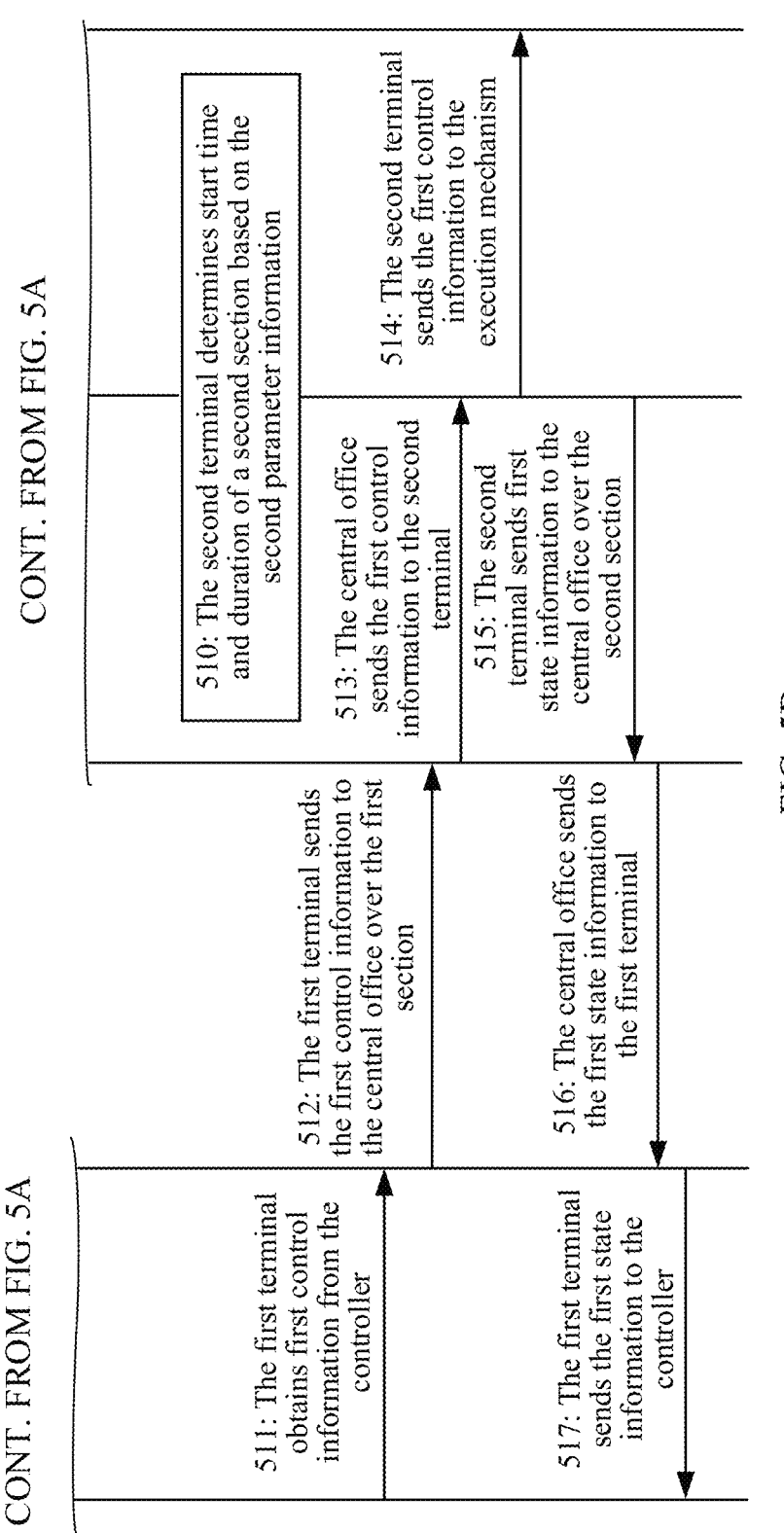

CONT. FROM FIG. 5A

CONT. FROM FIG. 5A

510: The second terminal determines start time and duration of a second section based on the second parameter information 511: The first terminal obtains first control information from the controller 512: The first terminal sends the first control information to the central office over the first section 513: The central office sends the first control information to the second terminal 514: The second terminal sends the first control information to the execution mechanism 515: The second terminal sends first state information to the central office over the second section 516: The central office sends the first state information to the first terminal 517: The first terminal sends the first state information to the controller

Allocation
period 1

702b

Allocation
period 2

Central
office

The central office
sends first data to
the second terminal

Second
compensation
duration

Processing
duration

The second terminal sends
first state information to the
central office

Second
terminal

801

OPTICAL BUS COMMUNICATION METHOD AND SYSTEM, DEVICE, AND MEDIUM

CROSS-REFERENCE TO RELATED APPLICATIONS

This application is a continuation of International Application No. PCT/CN2021/125212, filed on Oct. 21, 2021, which claims priority to Chinese Patent Application No. 202110217060.9, filed on Feb. 26, 2021. The disclosures of the aforementioned applications are hereby incorporated by reference in their entireties.

TECHNICAL FIELD

This application relates to the communication field, and in particular, to an optical bus communication method and system, a device, and a medium.

BACKGROUND

The industrial field bus is an industrial data bus that has developed rapidly in recent years. The industrial field bus mainly resolves problems of digital communication between field devices such as intelligent instruments, controllers, and/or execution mechanisms, and information transfer between these field control devices and an advanced control system.

To replace the conventional twisted pair wiring manner for information transfer, industrial optical network (or a passive optical network, PON) bus communication is emerging. FIG. 1 shows a system architecture of an industrial PON network in conventional technologies. The architecture includes two layers of architectures: a first layer, namely, an industrial internet layer 11; and a second layer, namely, an industrial optical bus layer 12 (bus PON). Optionally, the architecture of the industrial internet layer 11 may be a time-sensitive networking (TSN), and includes factory optical gateways 101 configured to exchange messages between programmable logic controllers (PLCs). The architecture of the industrial optical bus layer 12 is configured to implement message exchange between a PLC 102 and slave stations 103. The slave station 103 is connected to a field execution mechanism 104. The PLC 102 sends control information to the execution mechanism 104 using the architecture, to enable the execution mechanism 104 to work based on the control information, so as to implement control over the execution mechanism by a controller. In the architecture shown in FIG. 1, the PLC 102 is connected to a master station 105, and an optical line termination (OLT) 1051 and an optical network unit (ONU) 1052 are arranged in the master station 105. The ONU 1052 is configured to connect to a factory optical gateway 101 in the first layer of architecture to implement communication with another PLC. The OLT 1051 is configured to connect to a slave station 103 in the second layer of architecture to implement communication between the PLC 102 and an execution mechanism 104.

In the conventional technology shown in FIG. 1, the second layer of network is an optical bus communication system. The system is a two-level architecture including a master station and a slave station. System settings are redundant, restricting flexibility of PLC deployment. For example, when there are a plurality of PLC groups, the master station needs to be connected to a plurality of switches to implement access of a plurality of PLCs, bringing extra costs and communication duration.

Therefore, the foregoing problems existing in the conventional technologies remain to be alleviated.

SUMMARY

Embodiments of this application provide an optical bus communication method and system, a device, and a medium, to connect a controller to a terminal to resolve a problem that flexibility of deploying the controller is inadequate.

In view of this, a first aspect of this application provides an optical bus communication method, including: a first terminal obtains first control information from a controller, where the first control information is generated by the controller and is used to control an execution mechanism to work. The first terminal sends the first control information to a central office over a first section, so that the central office forwards the first control information to a second terminal, where the second terminal is connected to the execution mechanism. The first terminal obtains first state information from the central office, where the first state information is used to record a working state of the execution mechanism, the first state information is information sent by the second terminal to the central office over a second section after the second terminal obtains the first control information, and the first section does not overlap with the second section.

In this embodiment, the controller is connected to a position of a terminal, so that the controller can be flexibly deployed. In addition, because the first section and the second section in which the first terminal and the second terminal send messages to the central office do not overlap, no upstream message conflict occurs between the first terminal and the second terminal, implementing flat access of the controller, reducing redundancy of an optical bus communication system architecture, and reducing communication duration and device costs.

Optionally, the method further includes: the first terminal obtains first compensation duration from the central office, where the first compensation duration is duration obtained by performing ranging on the first terminal by the central office. That the first terminal sends the first control information to a central office over a first section includes: the first terminal sends, after the first compensation duration, the first control information to the central office over the first section.

In this embodiment, the first compensation duration is determined by the central office. Optionally, the first compensation duration and the second compensation duration are equalization delays (EQDs), and the EQDs are duration obtained by performing ranging on the first terminal by the central office separately. In a working process, the central office is connected to a plurality of different terminals, which are served as slave stations, and the central office needs to perform ranging on distances between the terminals and the central office. In a method, ranging is performed on all terminals for a same distance, and then an EQD is allocated to each terminal based on a ranging result, to compensate for a duration difference between different terminals and the central office due to different distances.

Optionally, the method further includes:

The first terminal determines start time and duration of the first section based on an indication of the central office, where the duration of the first section is determined by the central office based on a target section length, duration of the second section is greater than or equal to the duration of the first section, and the duration and start time of the second section are determined by the central office and sent to the second terminal.

The target section length is equal to target one-way time of information from the first terminal to the second terminal, where the target one-way time includes at least one of forwarding duration of the first terminal, duration of upstream and downstream optical fiber transmission of the information between the first terminal, the second terminal, and the central office, forwarding duration of the central office, second compensation duration, and processing duration.

The forwarding duration of the first terminal is duration of forwarding the first control information by the first terminal, the forwarding duration of the central office is duration of forwarding information by the central office, the second compensation duration is duration obtained by performing ranging on the second terminal by the central office, and the processing duration is duration, determined by the central office, of processing a received downstream message by the second terminal.

In this embodiment, because the first terminal and the second terminal share a same main optical fiber to send upstream data to the central office, to avoid an upstream conflict, the central office needs to ensure that the first section does not overlap with the second section. Optionally, the central office may determine that the first section and the second section respectively occupy an odd-numbered section and an even-numbered section. The duration of the second section is greater than or equal to the duration of the first section. The first control information sent by the first terminal in the first section arrives at the second terminal after the target one-way time (that is, the duration of the first section). In this case, the second terminal needs to reply with the first state information in the second section. If the first terminal sends the first control information at an end time point of the first section, the second terminal has an opportunity to reply with the first state information at the end of the second section only when the duration of the second section is at least equal to the first section; or if the duration of the second section is shorter than the first section, the second terminal has no opportunity to reply with the first state information in the second section. Preferably, the duration of the first section is equal to the duration of the second section, to ensure higher bandwidth utilization in a transmission process while ensuring that no upstream conflict occurs between the first terminal and the second terminal.

Optionally, that the first terminal sends the first control information to a central office over a first section includes: the first terminal sends the first control information to the central office over the first section in N sections in a target period, where the target period is an allocation period authorized by the central office to the first terminal, and N is a positive integer greater than or equal to 1.

In this embodiment, the first terminal reduces a delay of sending the first control information over a plurality of first sections in the target period. However, when the first control information cannot be completely sent in one first section, because a plurality of first sections are used, a next first section arrives faster. Compared with a manner in which the first control information is sent in the target period by using one first section, this manner greatly reduces a waiting delay, and improves data sending efficiency.

Optionally, the target period includes a first sub-period and a second sub-period. That the first terminal sends the first control information to a central office over a first section includes:

The first terminal sends the first control information to the central office over the first section in the first sub-period.

The method further includes:

The first terminal sends a target authorization request to the central office in the second sub-period, where the target authorization request is used to request the central office to authorize an upstream allocation section to the first terminal, the target authorization request is a request generated by the first terminal based on second control information, and the second control information is used to control a third terminal to work.

The first terminal obtains a third section from the central office, where the third section is a section determined by the central office based on the target authorization request.

The first terminal sends the second control information to the central office over the third section, and the central office sends the second control information to the third terminal.

In this embodiment, the first terminal divides one target period into two segments, and one segment is used to send the first control information to the second terminal that has a high delay requirement, to obtain a lower delay and improve performance. The other segment is used to send the second control information to the third terminal that has a low delay requirement, and a conventional sending manner is used to achieve lower bandwidth consumption, to implement coexistence of different working manners between the first terminal and terminals that have different delay requirements.

A second aspect of this application provides an optical bus communication method, including:

A second terminal obtains first control information from a central office, where the first control information is generated by a controller, the first control information is information sent by a first terminal to the central office over a first section, and the first terminal is connected to the controller. The second terminal sends the first control information to an execution mechanism, so that the execution mechanism works under control of the first control information. The second terminal sends first state information to the central office over a second section, where the first state information is used to record a working state of the execution mechanism, and the first section does not overlap with the second section.

In this embodiment, the controller is connected to a position of a terminal, so that the controller can be flexibly deployed. In addition, because the first section and the second section in which the first terminal and the second terminal send messages to the central office do not overlap, no upstream message conflict occurs between the first terminal and the second terminal, implementing flat access of the controller, reducing redundancy of an optical bus communication system architecture, and reducing communication duration and device costs.

Optionally, the method further includes: the second terminal obtains second compensation duration and processing duration from the central office, where the second compensation duration is duration obtained by performing ranging on the second terminal by the central office, and the processing duration is duration, determined by the central office, of processing a received downstream message by the second terminal. After that a second terminal obtains first control information from a central office, the method further includes: the second terminal sends the first state information to the central office after the second compensation duration and the processing duration when obtaining the first control information.

In this embodiment, the second compensation duration is determined by the central office. Optionally, the second compensation duration is an equalization delay (EQD), and the EQD is duration obtained by performing ranging on the second terminal by the central office separately. In a working process, the central office is connected to a plurality of different terminals, which are served as slave stations, and the central office needs to perform ranging on distances between the terminals and the central office. In a method, ranging is performed on all terminals for a same distance, and then an EQD is allocated to each terminal based on a ranging result, to compensate for a duration difference between different terminals and the central office due to different distances. Further, because the processing duration is a preset fixed value, the first terminal can determine time at which the second terminal feeds back state information, to prevent an offset.

Optionally, the method further includes: the second terminal determines start time and duration of the second section based on an indication of the central office, where the duration of the second section is determined by the central office based on a target section length, duration of the second section is greater than or equal to the duration of the first section, and the duration and start time of the first section are determined by the central office and sent to the first terminal. The target section length is equal to target one-way time of information from the first terminal to the second terminal, where the target one-way time includes at least one of forwarding duration of the first terminal, duration of upstream and downstream optical fiber transmission of the information between the first terminal, the second terminal, and the central office, forwarding duration of the central office, second compensation duration, and processing duration. The forwarding duration of the first terminal is duration of forwarding the first control information by the first terminal, and the forwarding duration of the central office is duration of forwarding information by the central office. The second compensation duration is duration obtained by performing ranging on the second terminal by the central office, and the processing duration is duration, determined by the central office, of processing a received downstream message by the second terminal.

In this embodiment, because the first terminal and the second terminal share a same main optical fiber to send upstream data to the central office, to avoid an upstream conflict, the central office needs to ensure that the first section does not overlap with the second section. Optionally, the central office may determine that the first section and the second section respectively occupy an odd-numbered section and an even-numbered section. The duration of the second section is greater than or equal to the duration of the first section. The first control information sent by the first terminal in the first section arrives at the second terminal after the target one-way time (that is, the duration of the first section). In this case, the second terminal needs to reply with the first state information in the second section. If the first terminal sends the first control information at an end time point of the first section, the second terminal has an opportunity to reply with the first state information at the end of the second section only when the duration of the second section is at least equal to the first section; or if the duration of the second section is shorter than the first section, the second terminal has no opportunity to reply with the first state information in the second section. Preferably, the duration of the first section is equal to the duration of the second section, to ensure higher bandwidth utilization in a transmission process while ensuring that no upstream conflict occurs between the first terminal and the second terminal.

A third aspect of this application provides an optical bus communication method, including: a central office obtains first control information from a first terminal over a first section, where the first control information is generated by a controller and is used to control an execution mechanism to work, and the first terminal is connected to the controller. The central office sends the first control information to a second device, where the second device is connected to the execution mechanism, to enable the second device to send the first control information to the execution mechanism. The central office obtains first state information from the second terminal over a second section, where the first state information is used to record a working state of the execution mechanism, and the first section does not overlap with the second section. The central office sends the first state information to the first terminal.

In this embodiment, the controller is connected to a position of a terminal, so that the controller can be flexibly deployed. In addition, because the first section and the second section in which the first terminal and the second terminal send messages to the central office do not overlap, no upstream message conflict occurs between the first terminal and the second terminal, implementing flat access of the controller, reducing redundancy of an optical bus communication system architecture, and reducing communication duration and device costs.

Optionally, the method further includes: the central office obtains first compensation duration based on a ranging result of the first terminal. The central office sends the first compensation duration to the first terminal, to enable the first terminal to determine, based on the first compensation duration, a time point of sending the first control information to the central office. The central office obtains second compensation duration based on a ranging result of the second terminal. The central office determines processing duration of processing a received downstream message by the second terminal. The central office sends the second compensation duration and the processing duration to the first terminal, to enable the second terminal to send, when obtaining the first control information, the first state information to the central office after the second compensation duration and the processing duration.

In this embodiment, the first compensation duration and the second compensation duration are separately determined by the central office. Optionally, the first compensation duration and the second compensation duration are equalization delays (EQDs), and the EQDs are duration obtained by performing ranging on the first terminal and the second terminal by the central office respectively. In a working process embodiment, the central office is connected to a plurality of different terminals, which are served as slave stations, and the central office needs to perform ranging on distances between the terminals and the central office. In a method embodiment, ranging is performed on all terminals for a same distance, and then an EQD is allocated to each terminal based on a ranging result, to compensate for a duration difference between different terminals and the central office due to different distances. Further, the processing duration is a duration value reserved by the central office for the second terminal, so that the second terminal processes data within the processing duration. In this way, a parameter setting between terminals with different distances is implemented.

Optionally, the method further includes: the central office determines a target section length based on target one-way time of information from the first terminal to the second terminal, where the target section length is equal to the target one-way time. The central office determines start time and duration of the first section, where the duration of the first section is equal to the target one-way time. The central office determines start time and duration of the second section, where the duration of the second section is greater than or equal to the target one-way time. The central office sends first parameter information to the first terminal, where the first parameter information indicates the start time and the duration of the first section. The central office sends second parameter information to the second terminal, where the second parameter information indicates the start time and the duration of the second section.

In this embodiment, the central office indicates an upstream sending section to the first terminal and the second terminal. In this way, in a subsequent optical bus transmission process, the first terminal and the second terminal may send upstream information to the central office based on sections allocated by the central office, and the central office may not deliver a bandwidth map (Bwmap) of a bus, saving communication bandwidth resources.

Optionally, the method further includes: the central office obtains, from the first terminal, forwarding duration of the first terminal and duration of upstream and downstream optical fiber transmission of information between the first terminal and the central office, where the forwarding duration of the first terminal is duration of forwarding the first control information by the first terminal. The central office obtains, from the second terminal, duration of upstream and downstream optical fiber transmission of information between the second terminal and the central office. That the central office determines a target section length based on target one-way time of information from the first terminal to the second terminal includes: the central office determines the target section length based on at least one of the forwarding duration of the first terminal, the duration of upstream and downstream optical fiber transmission of the information between the first terminal, the second terminal, and the central office, the forwarding duration of the central office, the second compensation duration, and the processing duration, where the forwarding duration of the central office is duration of forwarding the information by the central office.

In this embodiment, the first control information sent by the first terminal in the first section arrives at the second terminal after the target one-way time (that is, the duration of the first section). Therefore, the second terminal may reply with the first state information in the second section. Optionally, when the duration of the first section is equal to that of the second section, if the first terminal sends the first control information at an end time point of the first section, the second terminal may reply with the first state information at an end time point of the second section, to ensure that no upstream conflict occurs between the first terminal and the second terminal, and ensure higher bandwidth utilization in a transmission process.

A fourth aspect of this application provides a terminal device, including: an obtaining unit, configured to obtain first control information from a controller, where the first control information is generated by the controller and is used to control an execution mechanism to work; and a sending unit, configured to send the first control information obtained by the obtaining unit to a central office over a first section, so that the central office forwards the first control information to a second terminal, where the second terminal is connected to the execution mechanism.

The obtaining unit is further configured to obtain first state information from the central office, where the first state information is used to record a working state of the execution mechanism, the first state information is information sent by the second terminal to the central office over a second section after the second terminal obtains the first control information sent by the sending unit, and the first section does not overlap with the second section.

Optionally, the obtaining unit is further configured to obtain first compensation duration from the central office, and the first compensation duration is duration obtained by performing ranging on the first terminal by the central office. The sending unit is further configured to: send, for the first terminal after the first compensation duration, the first control information to the central office over the first section.

Optionally, the device further includes a determining unit, configured to: determine start time and duration of the first section based on an indication of the central office, where the duration of the first section is determined by the central office based on a target section length, duration of the second section is greater than or equal to the duration of the first section, and the duration and start time of the second section are determined by the central office and sent to the second terminal. The target section length is equal to target one-way time of information from the first terminal to the second terminal, where the target one-way time includes at least one of forwarding duration of the first terminal, duration of upstream and downstream optical fiber transmission of the information between the first terminal, the second terminal, and the central office, forwarding duration of the central office, second compensation duration, and processing duration. The forwarding duration of the first terminal is duration of forwarding the first control information by the first terminal, and the forwarding duration of the central office is duration of forwarding information by the central office. The second compensation duration is duration obtained by performing ranging on the second terminal by the central office, and the processing duration is duration, determined by the central office, of processing a received downstream message by the second terminal.

Optionally, the sending unit is further configured to: send the first control information to the central office over the first section in N sections in a target period, where the target period is an allocation period authorized by the central office to the first terminal, and N is a positive integer greater than or equal to 1.

Optionally, the target period includes a first sub-period and a second sub-period. The sending unit is further configured to: send the first control information to the central office over the first section in the first sub-period.

The sending unit is further configured to: send, for the first terminal, a target authorization request to the central office in the second sub-period, where the target authorization request is used to request the central office to authorize an upstream allocation section to the first terminal, the target authorization request is a request generated by the first terminal based on second control information, and the second control information is used to control a third terminal to work.

The obtaining unit is further configured to obtain a third section from the central office, and the third section is a section determined by the central office based on the target authorization request.

The sending unit is further configured to send the second control information to the central office over the third section, so that the central office sends the second control information to the third terminal.

A fifth aspect of this application provides a terminal device, including: an obtaining unit, configured to obtain first control information from a central office, where the first control information is generated by a controller, the first control information is information sent by a first terminal to the central office over a first section, and the first terminal is connected to the controller; and a sending unit, configured to send the first control information obtained by the obtaining unit to an execution mechanism, so that the execution mechanism works under control of the first control information.

The sending unit is further configured to send first state information to the central office over a second section, where the first state information is used to record a working state of the execution mechanism, and the first section does not overlap with the second section.

Optionally, the obtaining unit is further configured to obtain second compensation duration and processing duration from the central office, where the second compensation duration is duration obtained by performing ranging on the second terminal by the central office, and the processing duration is duration, determined by the central office, of processing a received downstream message by the second terminal. The sending unit is further configured to: send the first state information to the central office after the second compensation duration and the processing duration when the second terminal obtains the first control information.

Optionally, the device further includes a determining unit, configured to determine start time and duration of the second section based on an indication of the central office, where the duration of the second section is determined by the central office based on a target section length, duration of the second section is greater than or equal to the duration of the first section, and the duration and start time of the first section are determined by the central office and sent to the first terminal. The target section length is equal to target one-way time of information from the first terminal to the second terminal, where the target one-way time includes at least one of forwarding duration of the first terminal, duration of upstream and downstream optical fiber transmission of the information between the first terminal, the second terminal, and the central office, forwarding duration of the central office, second compensation duration, and processing duration. The forwarding duration of the first terminal is duration of forwarding the first control information by the first terminal, and the forwarding duration of the central office is duration of forwarding information by the central office. The second compensation duration is duration obtained by performing ranging on the second terminal by the central office, and the processing duration is duration, determined by the central office, of processing a received downstream message by the second terminal.

A sixth aspect of this application provides a central office device, including: an obtaining unit, configured to obtain first control information from a first terminal over a first section, where the first control information is generated by a controller and is used to control an execution mechanism to work, and the first terminal is connected to the controller; and a sending unit, configured to send the first control information obtained by the obtaining unit to a second device, where the second device is connected to the execution mechanism, to enable the second device to send the first control information to the execution mechanism.

The obtaining unit is further configured to obtain first state information from the second terminal over a second section, where the first state information is used to record a working state of the execution mechanism, and the first section does not overlap with the second section.

The sending unit is further configured to send the first state information to the first terminal.

Optionally, the apparatus further includes a determining unit, configured to: obtain first compensation duration based on a ranging result of the first terminal.

The sending unit is further configured to send the first compensation duration to the first terminal, to enable the first terminal to determine, based on the first compensation duration, a time point of sending the first control information to the central office.

The determining unit is further configured to obtain second compensation duration based on a ranging result of the second terminal.

The determining unit is further configured to determine processing duration of processing a received downstream message by the second terminal.

The sending unit is further configured to send the second compensation duration and the processing duration to the first terminal, to enable the second terminal to send, when obtaining the first control information, the first state information to the central office after the second compensation duration and the processing duration.

Optionally, the determining unit is further configured to: determine a target section length based on target one-way time of information from the first terminal to the second terminal, where the target section length is equal to the target one-way time; determine start time and duration of the first section, where the duration of the first section is equal to the target one-way time determined by the determining unit; and determine start time and duration of the second section, where the duration of the second section is greater than or equal to the target one-way time determined by the determining unit.

The sending unit is further configured to: send first parameter information to the first terminal, where the first parameter information indicates the start time and the duration of the first section; and send second parameter information to the second terminal, where the second parameter information indicates the start time and the duration of the second section.

Optionally, the obtaining unit is further configured to: obtain, from the first terminal, forwarding duration of the first terminal and duration of upstream and downstream optical fiber transmission of information between the first terminal and the central office, where the forwarding duration of the first terminal is duration of forwarding the first control information by the first terminal; and obtain, from the second terminal, duration of upstream and downstream optical fiber transmission of information between the second terminal and the central office.

The determining unit is further configured to determine the target section length based on at least one of the forwarding duration of the first terminal, the duration of upstream and downstream optical fiber transmission of the information between the first terminal, the second terminal, and the central office, the forwarding duration of the central office, the second compensation duration, and the processing duration, where the forwarding duration of the central office is duration of forwarding the information by the central office.

A seventh aspect of this application provides an optical bus communication system, including: a first terminal, a second terminal, and a central office, where the first terminal and the second terminal are separately connected to the central office.

The first terminal is configured to obtain first control information from a controller, where the first control information is generated by the controller and is used to control an execution mechanism to work.

The central office is configured to indicate an upstream first section to the first terminal.

The first terminal is further configured to send the first control information to the central office over the first section.

The central office is further configured to forward the first control information to the second terminal.

The second terminal is configured to send the first control information to the execution mechanism.

The central office is further configured to indicate an upstream second section to the second terminal, where the first section does not overlap with the second section.

The second terminal is further configured to send first state information to the central office over the second section, where the first state information is used to record a working state of the execution mechanism.

The central office is further configured to forward the first state information to the first terminal.

Optionally, the controller is arranged on the first terminal, and the execution mechanism is arranged on the second terminal.

Optionally, the first terminal and the second terminal are optical network units (ONUs), the central office is an optical line termination (OLT), and the controller is a programmable logic controller (PLC).

An eighth aspect of this application provides an electronic device. The electronic device includes an interaction apparatus, an input/output (I/O) interface, a processor, and a memory, and the memory stores program instructions.

The interaction apparatus is configured to obtain operation instructions input by a user.

The processor is configured to execute the program instructions stored in the memory, to perform the method according to any one of the first aspect, the second aspect, or the third aspect.

A ninth aspect of this application provides a computer-readable storage medium. The computer-readable storage medium includes instructions. When the instructions are run on a computer device, the computer device is enabled to perform the method according to any one of the first aspect, the second aspect, or the third aspect.

BRIEF DESCRIPTION OF DRAWINGS

FIG. 5A and FIG. 5B are a diagram of an optical bus communication method according to an embodiment of this application;

DESCRIPTION OF EMBODIMENTS

Embodiments of the present disclosure provide an optical bus communication method, to resolve a problem of redundancy of a deployment architecture of a current optical bus communication system.

To make persons skilled in the art understand solutions in this application better, the following describes the technical solutions in embodiments of this application with reference to the accompanying drawings in embodiments of this application. It is clear that the described embodiments are merely some but not all of embodiments of this application. All other embodiments obtained by persons of ordinary skill in the art based on embodiments of this application without creative efforts shall fall within the protection scope of this application.

In the specification, claims, and accompanying drawings of this application, the terms "first", "second", "third", "fourth", and so on (if existent) are intended to distinguish between similar objects but do not necessarily indicate an order or sequence. It should be understood that data used in such a way is interchangeable in proper circumstances, so that embodiments of the present disclosure described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

An industrial field bus is an industrial data bus that has developed rapidly in recent years. The industrial field bus mainly resolves problems of digital communication between field devices such as an intelligent instrument, controllers, and execution mechanisms, and information transfer between these field control devices and an advanced control system.

Figure 2:
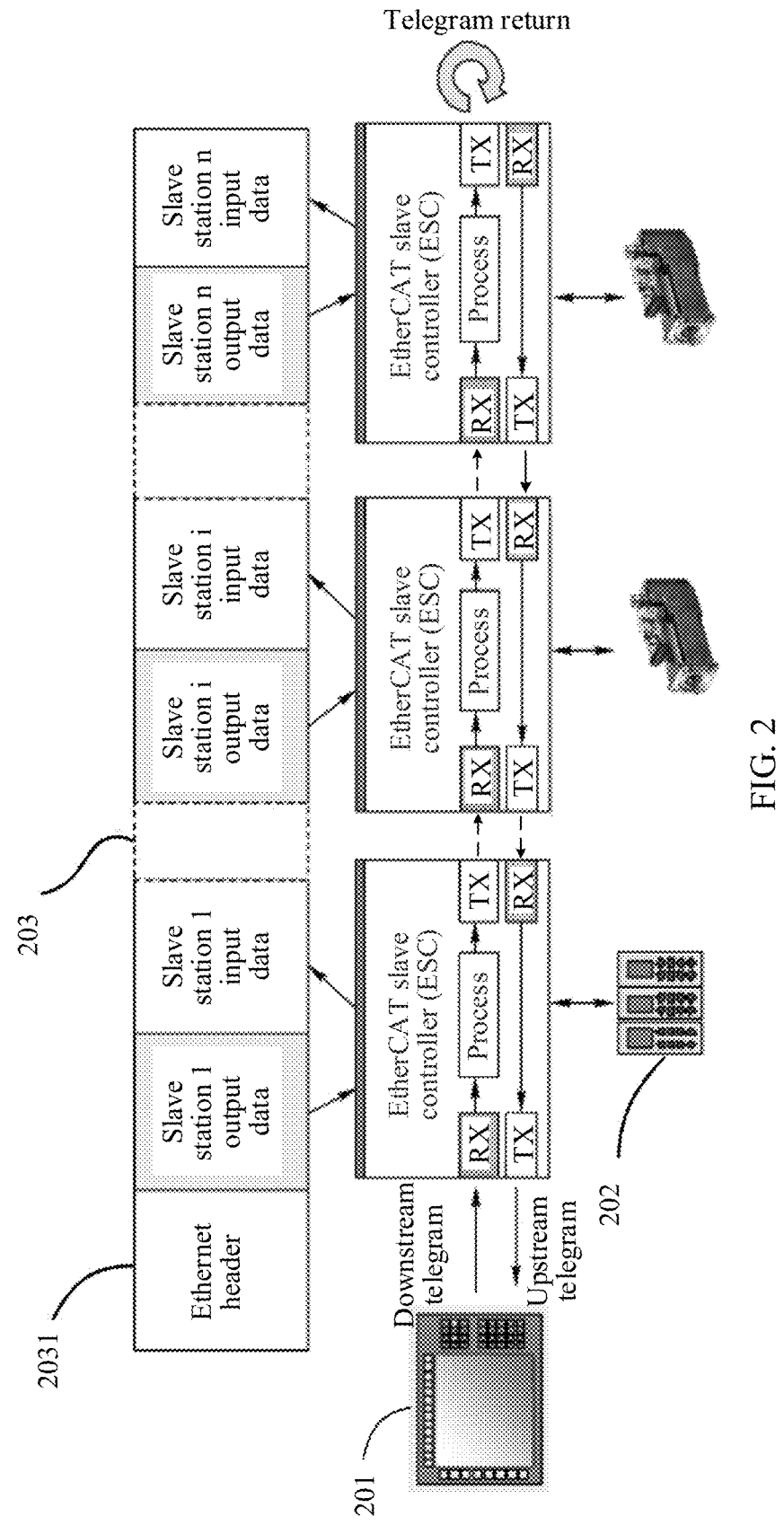
FIG. 2 is a diagram of a working principle of an EtherCAT.

The conventional Ethernet for control automation technology (EtherCAT) field bus protocol is a real-time industrial Ethernet technology that focuses on short cycle time (≤100 μs). For a working principle of the EtherCAT, refer to FIG. 2. FIG. 2 is a diagram of the working principle of EtherCAT. As shown in FIG. 2, a programmable logic controller (PLC) is connected to a master station 201, the master station 201 is responsible for sending control information and indication information to a slave station 202, and the slave station 202 is connected to an execution mechanism. Optionally, the execution mechanism may be a robot arm or the like. The control information is information generated by the PLC, and is used to control work of the execution mechanism. For example, the robot arm is enabled to process a product under control of the control information. The indication information indicates the slave station 202 to feed back a working state of the execution mechanism. For example, after receiving the control information, the robot arm works under control of the control information, and feeds back a working state of the robot arm to the slave station 202. The slave station 202 sends the working state of the robot arm to the PLC of the master station 201 under indication of the indication information, so that the PLC knows a current working state of the robot arm, and the PLC can further control subsequent work of the robot arm based on the current working state of the robot arm.

The master station 201 is connected to a plurality of slave stations 202, and each slave station 202 is connected to a separate execution mechanism. To enable the master station 201 to send data to each slave station 202, as shown in FIG. 2, a master station in the EtherCAT generates a data packet 203, including an Ether header 2031 and data corresponding to each slave station. The master station 201 sends the data packet 203 in a serial manner. First, the master station 201 sends the data packet 203 a slave station 1. The slave station 1 obtains, from the data packet 203 in a preset manner, some data frames corresponding to the data packet 203. Optionally, the data frames include control information 1 and indication information 1. The slave station 1 adds, based on the indication information 1, a working state of an execution mechanism to which the slave station 1 is connected to an agreed frame of the data packet 203. Then, the slave station 1 sends the data packet 203 to a slave station 2 in a downstream manner. The slave station 2 obtains, from the data packet 203 in a preset manner, some data frames corresponding to the data packet 203. Optionally, the data frames include control information 2 and indication information 2. The slave station 2 adds, based on the indication information 2, a working state of an execution mechanism to which the slave station 2 is connected to the agreed frame of the data packet 203. Then, the slave station 2 sends the data packet 203 to a slave station 3 in a downstream manner. Subsequent slave stations work in a same manner. After a last slave station n receives the data packet 203, the data packet 203 is sent to the master station via a slave station n−1, . . . , the slave station 3, the slave station 2, and the slave station 1 sequentially in an upstream manner. The data packet 203 records a working state of an execution mechanism corresponding to each slave station, implementing a data cycle of the data packet 203 between the master station and the slave station, and implementing data exchange between the master station and the slave stations.

Currently, a cycle period of EtherCAT can reach 31.25 μs. However, data is sent in a serial manner, causing longer duration as there are more slave stations. In addition, EtherCAT uses a conventional twisted pair manner for information transfer, resulting in a low signal transmission speed.

Figure 1:
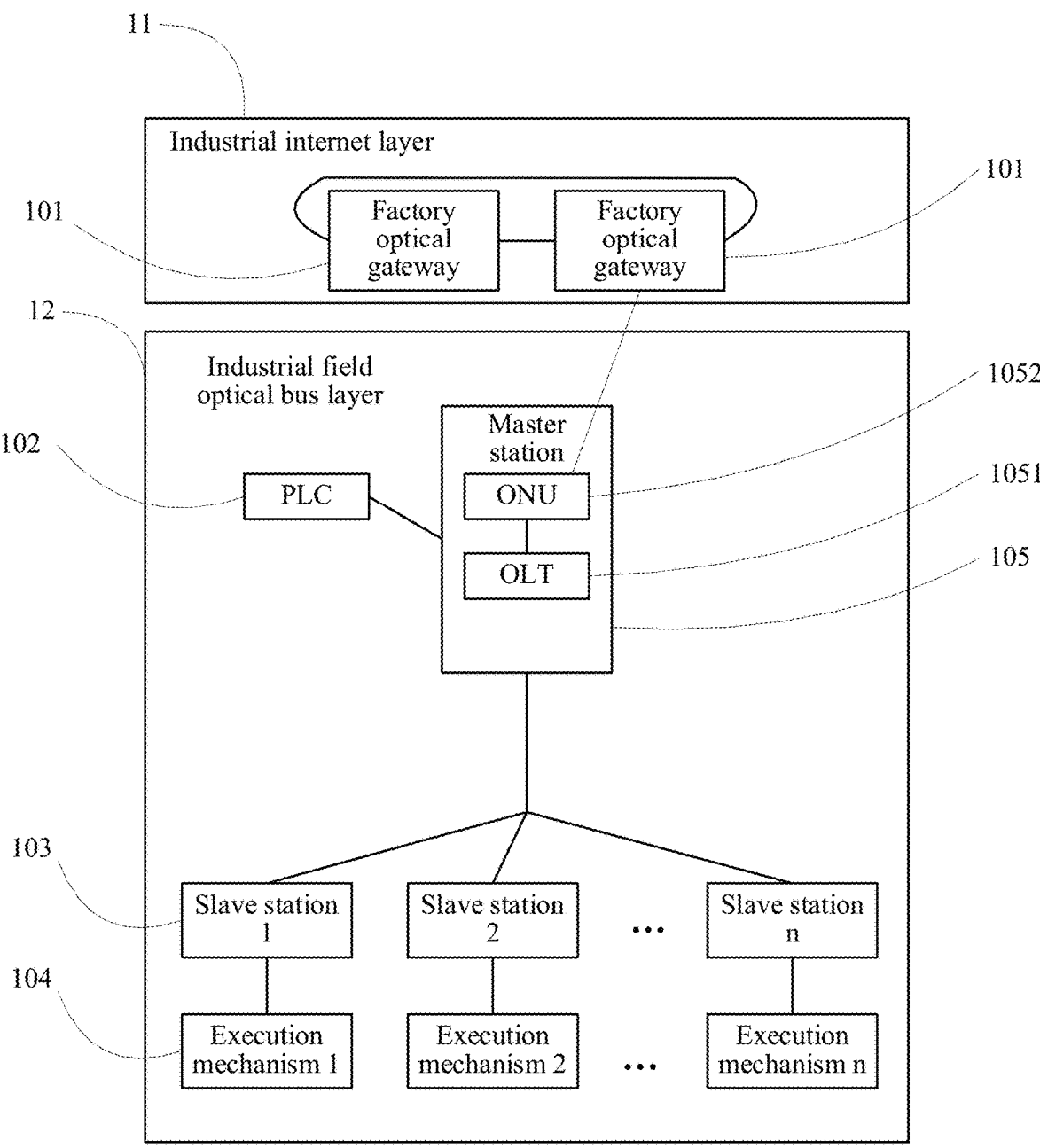
FIG. 1 is a system architecture diagram of an industrial PON network.

Therefore, to replace the EtherCAT working mode, an industrial optical network (or passive optical network, PON) optical bus communication is emerging. FIG. 1 shows a system architecture of a current industrial PON network. The system is a two-layer architecture including: a first layer, namely, an industrial internet layer 11; and a second layer, namely, industrial optical bus layer 12 (a bus PON). Optionally, the architecture of the industrial internet layer 11 may be time-sensitive networking (TSN), and includes factory optical gateways 101, configured to exchange messages between programmable logic controllers (PLCs). The architecture of the industrial optical bus layer 12 is configured to implement message exchange between a PLC 102 and slave stations 103. The slave station 103 is connected to a field execution mechanism 104. The PLC 102 sends control information to the execution mechanism 104 using the architecture, to enable the execution mechanism 104 to work based on the control information, so as to implement control over the execution mechanism by a controller. In the architecture shown in FIG. 1, the PLC 102 is connected to a master station 105, and an optical line termination (OLT) 1051 and an optical network unit (ONU) 1052 are arranged in the master station 105. The ONU 1052 is configured to connect to the factory optical gateway 101 in the first layer of architecture, to implement communication with another PLC. The OLT 1051 is configured to connect to the slave station 103 in the second layer of architecture, to implement communication between the PLC 102 and the execution mechanism 104.

In the architecture shown in FIG. 1, the second layer of network is an optical bus communication system. The system is a two-level architecture including a master station and a slave station. System settings are redundant, restricting flexibility of PLC deployment. For example, when there are a plurality of PLC groups, the master station needs to be connected to a plurality of switches to implement access of a plurality of PLCs, bringing extra costs and communication duration.

Therefore, to resolve the foregoing problem, embodiments of this application provide an optical bus communication method. According to the method, a PLC can be flexibly deployed by arranging the PLC at a position of an ONU, implementing flat access of the PLC, reducing redundancy of an optical bus communication system architecture, and reducing communication duration and device costs.

For ease of understanding, the following describes solutions in embodiments of this application in detail with reference to the accompanying drawings.

Figure 3:
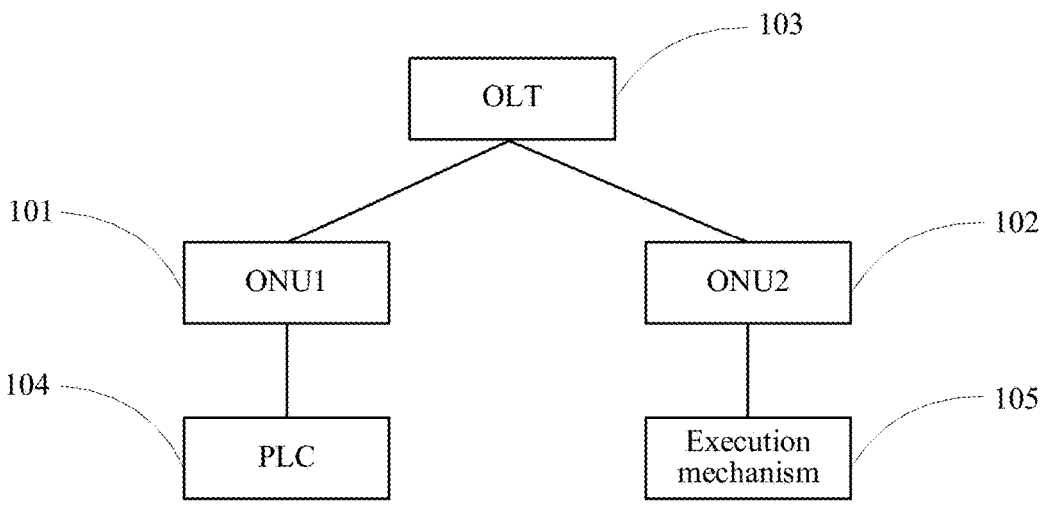
FIG. 3 is an architecture diagram of an optical bus communication system according to an embodiment of this application.

First, a system architecture of an optical bus communication system provided in this application is described. As shown in FIG. 3, an optical bus communication system provided in an embodiment of this application includes a first terminal ONU1 101, a second terminal ONU2 102, a central office OLT 103, a controller PLC 104, and an execution mechanism 105. The first terminal 101 and the second terminal 102 are separately connected to the central office 103, the first terminal 101 is connected to the controller 104, and the second terminal 102 is connected to the execution mechanism 105.

Optionally, the first terminal and the second terminal are optical network units (ONUs), the central office is an optical line termination (OLT), and the controller is a programmable logic controller (PLC).

It should be noted that the controller PLC 104 may be integrated into the first terminal ONU1 101 as a component, or may be connected to the first terminal ONU1 101 as an independent component. The execution mechanism 105 may be integrated into the second terminal ONU2 102 as a component, or may be connected to the second terminal ONU2 102 as an independent component.

Figure 4:
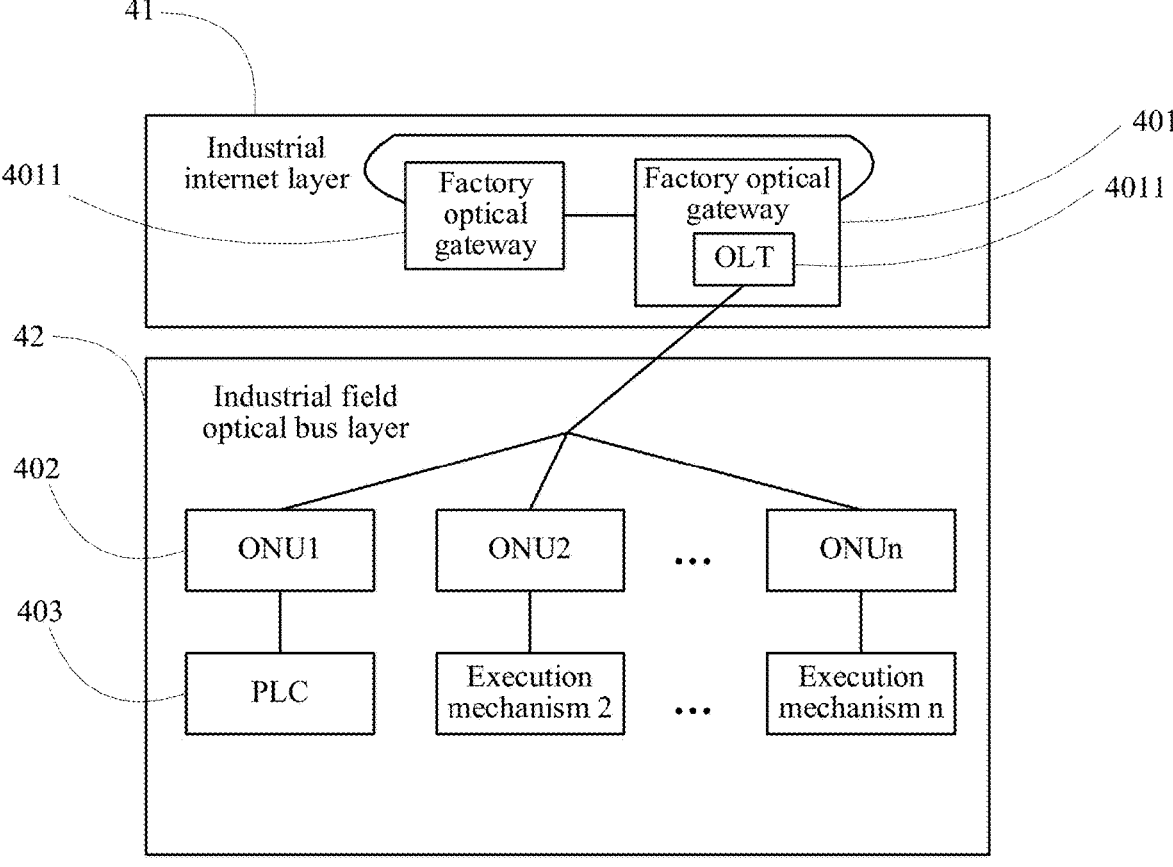
FIG. 4 is a system architecture diagram of an industrial PON network according to an embodiment of this application.

Using the system architecture shown in FIG. 3, the PLC is located at a position of the ONU instead of a position of the OLT in the current architecture, implementing flat access of the PLC, and improving flexibility of PLC deployment. Because PLC access can be implemented by using only a one-level network architecture, an obtained two-level network architecture diagram is shown in FIG. 4. An OLT 4011 is arranged in a factory optical network gateway 401 of an industrial internet layer 41, and the OLT 4011 may be directly connected to an ONU 402 in an industrial field optical bus layer 42, so that the industrial field optical bus layer can work using only a one-level network architecture. In addition, a PLC 403 may be deployed at a position of any ONU, improving flexibility of PLC deployment, and reducing costs and reduce transmission duration as there is no need to connect to an excessive quantity of switches.

To ensure that the foregoing system works normally, based on the foregoing system architecture, embodiments of this application further provide an optical bus communication method, so that the optical bus communication system can work normally. For ease of understanding, the following describes in detail the method provided in embodiments of this application with reference to the accompanying drawings.

Figure 5A:
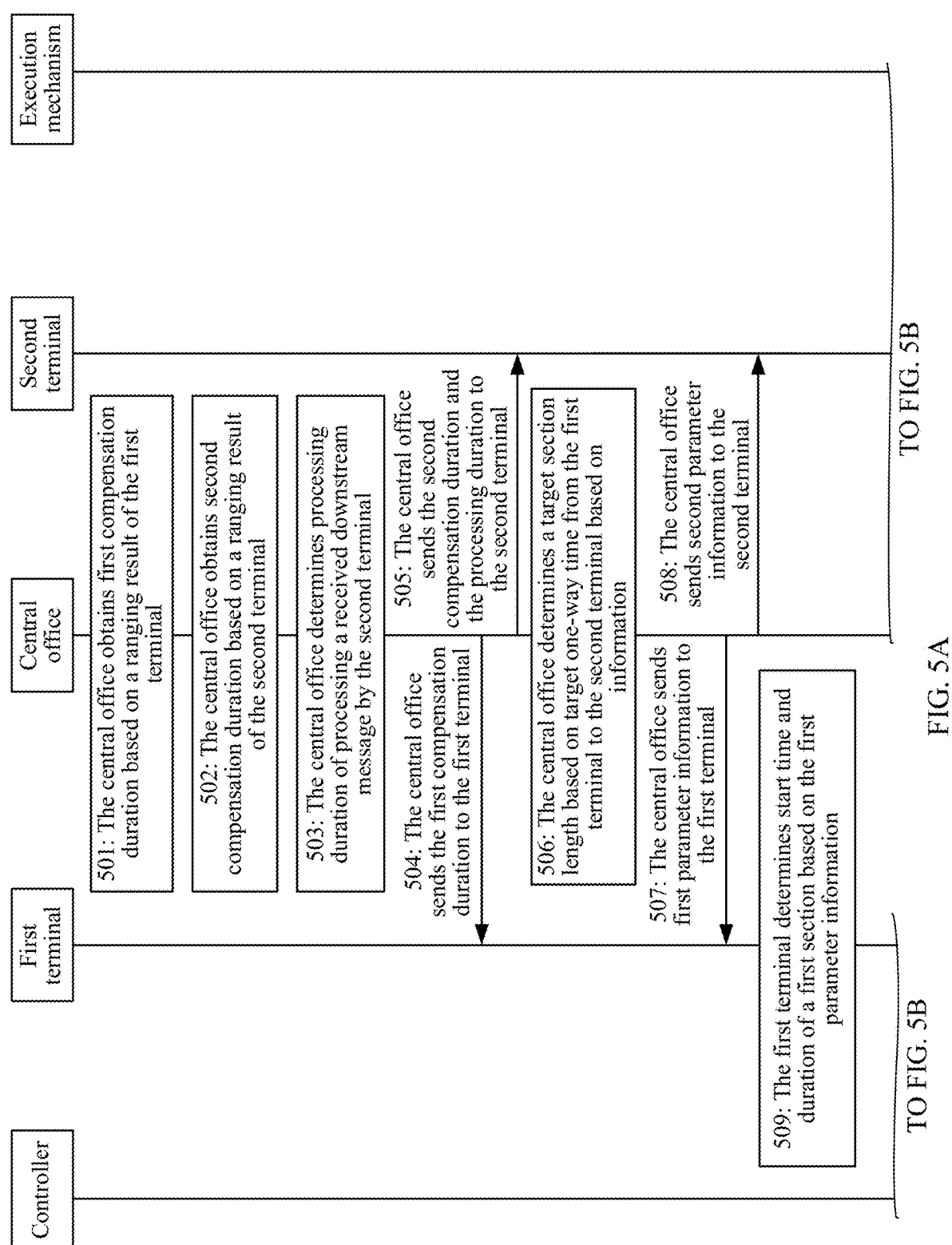

FIG. 5A and FIG. 5B are a diagram of an optical bus communication method according to an embodiment of this application. As shown in FIG. 5A and FIG. 5B, the method provided in this embodiment of this application includes the following steps.

501: A central office obtains first compensation duration based on a ranging result of a first terminal.

502: The central office obtains second compensation duration based on a ranging result of a second terminal.

In this embodiment, the first compensation duration and the second compensation duration are separately determined by the central office. Optionally, the first compensation duration and the second compensation duration are equalization delays (EQDs), and the EQDs are duration obtained by performing ranging on the first terminal and the second terminal by the central office respectively. In a working process embodiment, the central office is connected to a plurality of different terminals, which are served as slave stations, and the central office needs to perform ranging on distances between the terminals and the central office. In a method embodiment, ranging is performed on all terminals for a same distance, and then an EQD is allocated to each terminal based on a ranging result, to compensate for a duration difference between different terminals and the central office due to different distances.

503: The central office determines processing duration of processing a received downstream message by the second terminal.

In this embodiment, the processing duration is a duration value reserved by the central office for the second terminal, so that the second terminal processes data within the processing duration. In other words, the processing duration is duration, determined by the central office, of processing the received downstream message by the second terminal. Optionally, the processing duration is a fixed value determined by the central office. In this way, in an optical bus transmission process, a bandwidth map (Bwmap) of a bus may not be delivered, saving communication bandwidth resources.

504: The central office sends the first compensation duration to the first terminal.

In this embodiment, the central office sends the first compensation duration to the first terminal, so that the first terminal determines, based on the first compensation duration, an occasion for sending a message to the central office.

505: The central office sends the second compensation duration and the processing duration to the second terminal.

In this embodiment, the central office sends the second compensation duration and the processing duration to the first terminal, so that the second terminal determines, based on the second compensation duration and the processing duration, an occasion for sending a message to the central office.

506: The central office determines a target section length based on target one-way time of information from the first terminal to the second terminal.

In this embodiment, the target section length is equal to the target one-way time.

Optionally, the target one-way time is determined based on at least one of the following duration: forwarding duration of the first terminal, duration of upstream and downstream optical fiber transmission of information between the first terminal, the second terminal, and the central office, forwarding duration of the central office, the second compensation duration, and the processing duration. The forwarding duration of the first terminal is duration of forwarding the first control information by the first terminal, the forwarding duration of the central office is duration of forwarding information by the central office, the second compensation duration is duration obtained by performing ranging on the second terminal by the central office, and the processing duration is duration, determined by the central office, of processing a received downstream message by the second terminal.

For example, target one-way time=forwarding duration of the first terminal+duration of the upstream and downstream optical fiber transmission of the information between the first terminal, the second terminal, and the central office+forwarding duration of the central office+second compensation duration+processing duration. In other words, over a link between the first terminal and the second terminal, a sum of transmission duration of information in various phases is time needed for transmission of the information from the first terminal to the second terminal.

It should be noted that, the forwarding duration of the first terminal is reported by the first terminal to the central office. The duration of the upstream and downstream optical fiber transmission of the information between the first terminal, the second terminal, and the central office is determined using message receiving and sending tests between the central office, the first terminal, and the second terminal. The forwarding duration of the central office, the second compensation duration, and the processing duration are determined by the central office.

Further, the central office needs to determine start time and duration of a first section and a second section based on the target section length.

When the start time of the first section and the start time of the second section are determined, because the first terminal and the second terminal share a same main optical fiber to send upstream data to the central office, to avoid an upstream conflict, the central office needs to ensure that the first section does not overlap with the second section. For example, the first section is a section burst 1 in an upstream receiving period of the central office, and the second section is a section burst 2 in the upstream receiving period of the central office. In the PON field, one first section is referred to as one burst, and one burst is a bandwidth, allocated by the central office to a terminal, for one time of upstream sending. In a working process embodiment, an odd-numbered burst is used for the burst 1, and an even-numbered burst is used for the burst 2. Therefore, upstream slots of the first terminal and the second terminal do not overlap, avoiding the upstream conflict. An advantage of using this manner is that, the central office determines that an odd-numbered burst is used for the burst 1 and an even-numbered burst is used for the burst 2, to determine one period of the first section and the second section. The first terminal and the second terminal repeat the period in a subsequent working process, to ensure that the first section does not overlap with the second section. Optionally, the central office may further ensure, in another setting manner, that the first section does not overlap with the second section in one period. Further, the central office may set the start time of the first section and the second section in a one-off manner instead of in a periodical manner. This is not limited in this embodiment of this application.

Further, when determining duration of the first section and duration of the second section, the central office needs to ensure that the duration of the second section is greater than or equal to the duration of the first section. The reason lies in that, according to the foregoing example, the first section burst 1 and the second section burst 2 are arranged in a staggered manner in the odd-numbered burst and the even-numbered burst. The first control information sent by the first terminal in the first section arrives at the second terminal after the target one-way time (that is, the duration of the first section). In this case, the second terminal needs to reply with the first state information in the second section. If the first terminal sends the first control information at an end time point of the first section, the second terminal has an opportunity to reply with the first state information at the end of the second section only when the duration of the second section is at least equal to the first section; or if the duration of the second section is shorter than the first section, the second terminal has no opportunity to reply with the first state information in the second section. Preferably, the duration of the first section is equal to the duration of the second section, to ensure that no upstream conflict occurs between the first terminal and the second terminal, and ensure higher bandwidth utilization in a transmission process.

In a working process embodiment, the first terminal and the second terminal send a registration message to the central office at a go-online stage. The registration message is used to indicate to the central office whether a sending terminal of a current registration message is a terminal connected to a controller, so that the central office knows that the first terminal is the terminal connected to the controller, and the second terminal is a terminal that is not connected to the controller. Therefore, the central office can allocate the first section and the second section based on a condition of the terminal.

507: The central office sends first parameter information to the first terminal.

In this embodiment, the first parameter information includes the start time and the duration of the first section.

508: The central office sends second parameter information to the second terminal.

In this embodiment, the second parameter information includes the start time and the duration of the second section.

509: The first terminal determines the start time and the duration of the first section based on the first parameter information.

In this embodiment, the first terminal determines the start time and the duration of the first section based on the first parameter information, to determine, based on an indication of the first terminal, an occasion for subsequently sending an upstream message. In a subsequent message sending process, authorization of the central office is not needed. Therefore, in a subsequent optical bus transmission process, the Bwmap of the bus may not be delivered, saving communication bandwidth resources.

510: The second terminal determines the start time and the duration of the second section based on the second parameter information.

In this embodiment, the second terminal determines the start time and the duration of the second section based on the second parameter information, to determine, based on an indication of the second terminal, an occasion for subsequently sending an upstream message. In a subsequent message sending process, authorization of the central office is not needed. Therefore, in a subsequent optical bus transmission process, the Bwmap of the bus may not be delivered, saving communication bandwidth resources.

511: The first terminal obtains the first control information from the controller.

In this embodiment, the first control information is generated by the controller and is used to control an execution mechanism to work. When the controller is connected to the first terminal as an independent device, the first terminal obtains the first control information sent by the controller; or when the controller is integrated into the first terminal, the first terminal directly obtains the first control information from the controller.

In a working process embodiment, the first control information is information generated by a controller PLC, and is used to control an execution mechanism of a slave station to work. The PLC sends the generated first control information to the first terminal, so that the first terminal sends the first control information to the execution mechanism sequentially via the central office and the second terminal, to implement control of the PLC over the execution mechanism.

512: The first terminal sends the first control information to the central office over the first section.

In this embodiment, the first terminal sends the first control information to the central office in an upstream manner over the first section. Because the first section does not overlap with the second section, upstream sending of the first terminal does not conflict with that of the second terminal.

It should be noted that, in a process of communication between the first terminal and the central office, the central office needs to authorize an allocation period for the first terminal. Generally, the allocation period is 125 μs, and a data amount of one message frame may be carried in one allocation period. The central office determines whether to allocate, to the first terminal in one allocation period, a bandwidth for one time or more times of upstream sending. As described above, in the PON field, one first section is referred to as one burst, and one burst is the bandwidth, allocated by the central office to the terminal, for one time of upstream sending. A solution in which the central office allocates, to the first terminal in one allocation period, the bandwidth for one time of upstream sending is referred to as a single-frame single-burst solution, that is, the first terminal performs upstream sending over one first section in one allocation period. A solution in which the central office allocates, to the first terminal in one allocation period, the bandwidth for a plurality of times of upstream sending is referred to as a single-frame multi-burst solution, that is, the first terminal performs upstream sending over a plurality of first sections in one allocation period. For ease of understanding, the following separately describes the two sending solutions in detail.

1. Single-Frame Single-Burst Manner.

Figure 6A:
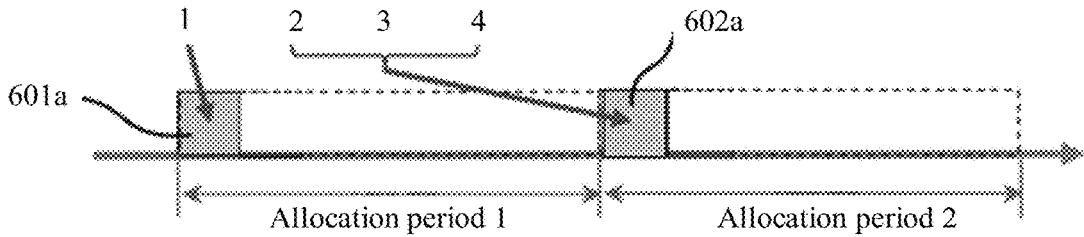
FIG. 6a is a diagram of an upstream sending manner of a first terminal in an optical bus communication method according to an embodiment of this application.

In this embodiment, the single-frame single-burst manner is shown in FIG. 6a. The first terminal sends the first control information using only one burst in one allocation period for upstream sending. For example, in a first allocation period, the first terminal uploads first control information 601a using one burst 1. In a second allocation period, the first terminal also uploads first control information 602a in a next period using one burst 1, to complete sending of different first control information in different periods.

Figure 6B:
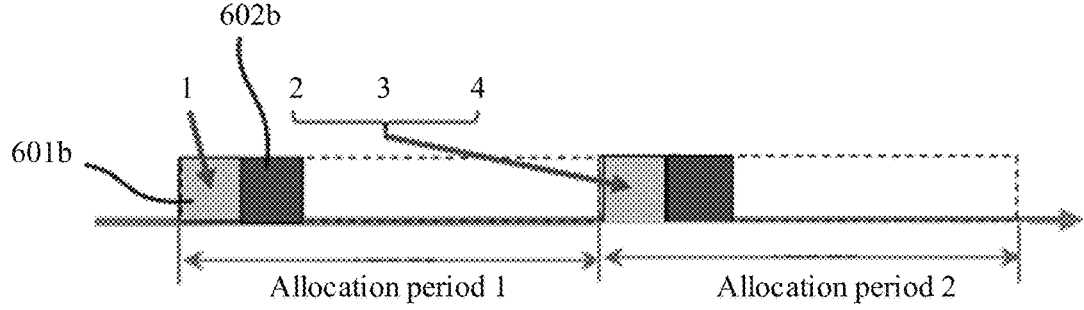
FIG. 6b is a diagram of another upstream sending manner of a first terminal in an optical bus communication method according to an embodiment of this application.

Further, if one first terminal is connected to a plurality of PLCs, or the central office is connected to a plurality of first terminals, and each terminal respectively corresponds to one PLC, each PLC is responsible for controlling some second terminals connected to the central office, each PLC forms one PLC group, and one PLC in each PLC group controls execution mechanisms corresponding to a plurality of second terminals. In different PLC groups, each PLC correspondingly needs to generate one piece of first control information, and the first terminal needs to allocate one burst to each PLC in one allocation period, so that each PLC has an opportunity to send the first control information. For example, as shown in FIG. 6b, two controllers PLC 1 and PLC 2 are separately connected to a first terminal, and the PLC 1 and the PLC 2 respectively correspond to first control information A 601b and second control information B 602b. In two bursts 1 in a first allocation period, the first terminal first sends the first control information A 601b in an upstream manner, and then sends the second control information B 602b, a slot GAP used for dividing two messages is provided between the first control information A 601b and the second control information B 602b. Therefore, in one allocation period, each PLC occupies an upstream sending bandwidth of one burst, to implement a single-frame single-burst upstream sending manner in a case of a plurality of PLCs.

In this embodiment, upstream sending of the first terminal is implemented in this manner. However, a disadvantage of this sending manner is that the sending manner has a large delay. If the first control information is not completely sent in the burst 1 of the first allocation period, retransmission of the first control information can continue to be performed only after a next allocation period arrives, resulting in long waiting time.

Therefore, to resolve the foregoing problem, an embodiment of this application further provides a single-frame multi-burst manner. The following provides detailed descriptions.

2. Single-Frame Multi-Burst Manner.

Figure 7A:
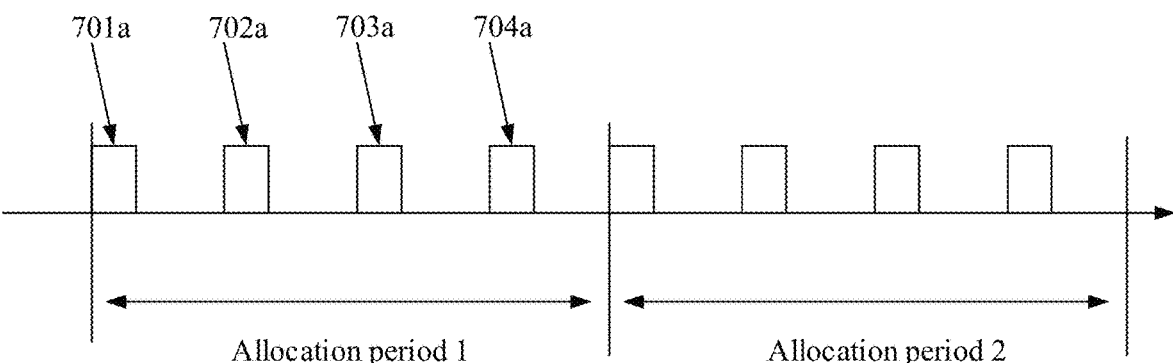
FIG. 7a is a diagram of another upstream sending manner of a first terminal in an optical bus communication method according to an embodiment of this application.

In this embodiment, in the single-frame multi-burst manner, the first terminal uses a plurality of first sections (bursts) in one allocation period to send the first control information. For example, as shown in FIG. 7a, the first control information may be divided into four parts: 701a, 702a, 703a, and 704a. In one allocation period, the first terminal uploads data of the four pieces of first control information (701a to 704a) by using four bursts 1, to complete sending of the first control information.

Figures 7B, 8:
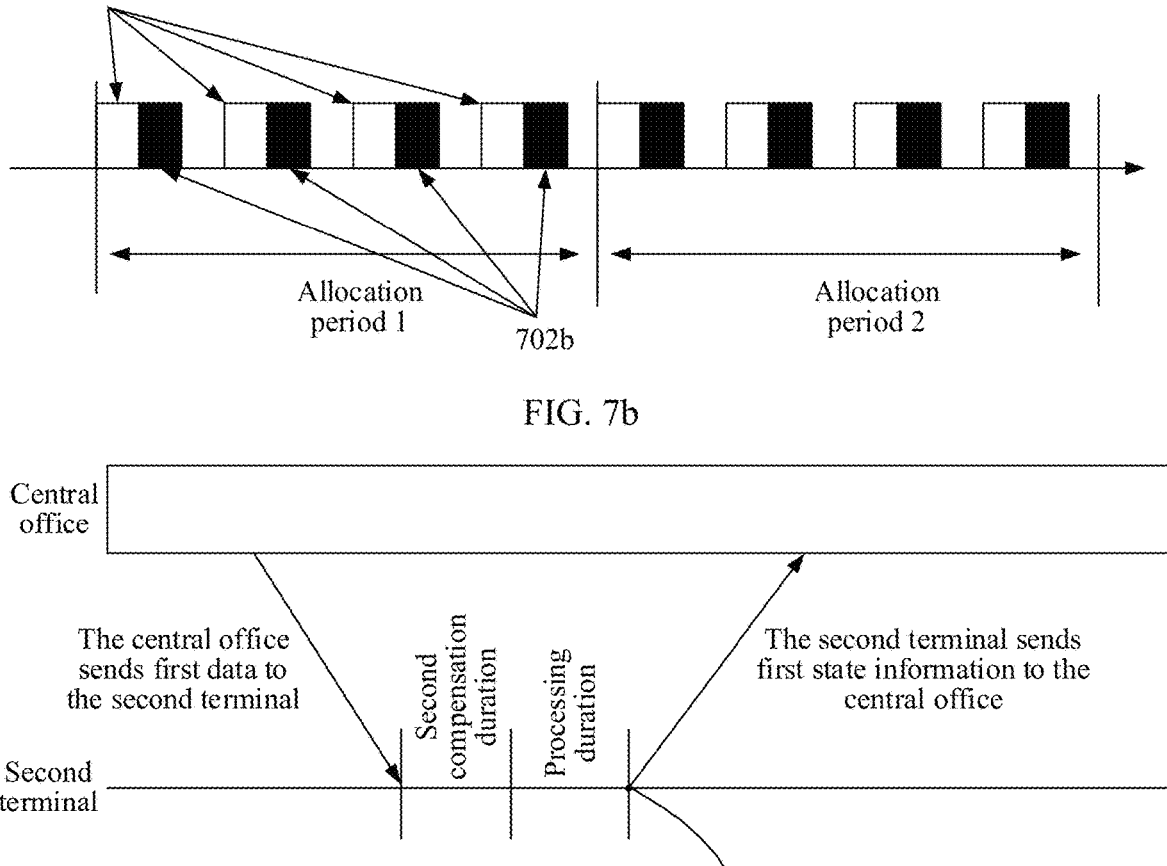
FIG. 7b is a diagram of another upstream sending manner of a first terminal in an optical bus communication method according to an embodiment of this application.
FIG. 8 is a diagram of an upstream sending manner of a second terminal in an optical bus communication method according to an embodiment of this application.

Further, if the system includes a plurality of PLC groups, for example, if the first terminal is connected to a plurality of PLCs, or the central office is connected to a plurality of first terminals, each PLC correspondingly generates one piece of first control information, and in one allocation period, each PLC separately sends the first control information over a plurality of first sections (bursts 1). For example, as shown in FIG. 7b, two controllers PLC 1 and PLC 2 are separately connected to the first terminal, or the central office is connected to two first terminals, the two first terminals are respectively connected to a PLC 1 and a PLC 2, and the PLC 1 and the PLC 2 respectively correspond to first control information A 701b and second control information B 702b. In one allocation period, the first control information A and the second control information B are sent over four first sections (bursts 1). In each burst 1, the first terminal first sends the first control information A in an upstream manner, and then sends the second control information B. A slot GAP used for dividing the two messages is provided between the first control information A and the second control information B. In this way, sending of upstream messages of two PLCs is implemented over four bursts 1 in one allocation period.

In this embodiment, the first terminal reduces a delay of sending the first control information in the single-frame multi-burst manner. For example, a length of one message frame is 125 μs. If four bursts 1 are set in one message frame, duration occupied by each burst 1 is 125 μs/4 bursts=31 μs. In other words, if the first control information cannot be completely sent in one burst, the first control information can be resent over a next burst only after 31 μs waiting. Compared with a case of needing to wait for a message frame for 125 μs in the single-frame single-burst manner, this manner greatly reduces a delay, and improves data sending efficiency.

For the single-frame multi-burst solution, a performance analysis is as follows:

A quantity of bytes available for each burst is limited. More bursts indicate more gap GAP overheads between the bursts. Therefore, a quantity of optical network terminations (ONTs) that can be supported decreases, and the quantity of bytes available for each burst is limited.

Calculation process: Duration of dynamic bandwidth assignment (DBA) is 3.9 μs, and the dynamic bandwidth assignment is calculated as 32 bursts in a single frame. However, only eight ONTs can be accessed, and the quantity of bytes available for each burst is only 40 bytes. Therefore, a complete Ethernet (ETH) packet cannot be encapsulated by using a GPON encapsulation method (GEM).

$$19440 \text{ Bytes}/32 \text{ bursts}/8 \text{ ONTs}{-}32 \text{ Byte GAP}{=}40 \text{ Bytes.} \qquad \text{Formula}$$

In the foregoing formula, a data amount that can be carried by the upstream sending bandwidth is 125 G bytes. According to conversion, a data amount that can be carried by one data frame of 125 μs is 19440 bytes, which is divided by 32 bursts in one data frame. In a solution of 32 bursts in a single frame, a quantity of ONTs in one data frame cannot exceed 8. Otherwise, sending time of each ONT in one burst is excessively short. Further, in one burst, an interval of one GAP is needed between data corresponding to different ONTs, and the 32 bursts include a GAP of 32 bytes.

Therefore, it is finally obtained through calculation that: in the solution of 32 bursts in a single frame, the quantity of bytes available for each burst is 40 bytes.

According to the foregoing calculation manner, for performance calculation corresponding to different quantities of bursts that are set in one data frame, refer to the following Table 1.

TABLE 1

| Quantity of bursts | Quantity of ONTs | Total GAP overheads | Total available bandwidth (upstream) | Bandwidth of each ONT (upstream) | Quantity of bytes available for each burst | Maximum DBA delay (upstream) |
|---|---|---|---|---|---|---|
| 1 | 64 | 2M * 1 * 64 = 128M | 1.1 G | 16M | 16M * 16 = 256 Bytes | 125 μs |
| 2 | 64 | 2M * 2 * 64 = 256M | 0.98 G | 14M | 14M/2 * 16 = 112 Bytes | 62.5 μs |
| 4 | 64 | 2M * 4 * 64 = 512M | 0.72 G | 10M | 10M/4 * 16 = 40 Bytes | 31.25 μs |
| 8 | 32 | 2M * 8 * 32 = 512M | 0.72 G | 20M | 20M/8 * 16 = 40 Bytes | 15.6 μs |
| 16 | 16 | 2M * 16 * 16 = 512M | 0.72 G | 40M | 40M/16 * 16 = 40 Bytes | 7.8 μs |
| 32 | 8 | 2M * 32 * 8 = 512 M | 0.72 G | 80M | 80M/32 * 16 = 40 Bytes | 3.9 μs |

In this embodiment, the first terminal sends the first control information to the central office in the first section. Because the first section does not overlap with the second section for upstream sending of the second terminal, an upstream sending conflict between the first terminal and the second terminal is avoided. Further, in an upstream sending process, the first terminal implements upstream sending of the first control information in a manner of a plurality of first sections in a single allocation period, to reduce a sending delay of the first control information, and improve sending efficiency.

513: The central office sends the first control information to the second terminal.

In this embodiment, the central office obtains, based on the foregoing manner, the first control information sent by the first terminal, and in this case, the central office may forward the first control information to the second terminal. Because the central office is connected to different slave stations (that is, the second terminals) through different optical fibers, a conflict problem does not need to be considered in a process of downstream sending of the central office. The central office may directly send the first control information to the second terminal. If the first terminal performs upstream sending in the foregoing single-frame single-burst manner, the central office forwards the first control information to the second terminal in a same manner. Similarly, if the first terminal performs upstream sending in the foregoing single-frame multi-burst manner, the central office forwards the first control information to the second terminal in a same manner.

514: The second terminal sends the first control information to the execution mechanism.

In this embodiment, the first control information is used to control work of the execution mechanism. After obtaining the first control information, the second terminal sends the first control information to the execution mechanism, so that the execution mechanism works under control of the first control information. For example, the execution mechanism is a mechanical arm, and the mechanical arm may work under control of the first control information, for example, process a product.

515: The second terminal sends the first state information to the central office over the second section.

In this embodiment, the first state information is used to record a working state of the execution mechanism, and the central office forwards the first state information to the first terminal, so that the first terminal knows the working state of the execution mechanism. The second section is a section determined by the central office, and the first section does not overlap with the second section. In this way, a problem of a conflict between upstream sending of the first terminal and upstream sending of the second terminal is avoided.

It should be noted that, a start time point at which the second terminal starts to send the first state information is determined based on pre-obtained second compensation duration and processing duration. As shown in FIG. 8, when the second terminal obtains data sent by the central office, the second terminal sends a feedback message to the central office after the second compensation duration and the processing duration in sequence. Therefore, the second terminal can determine, based on the second compensation duration and the processing duration, a start point 801 for sending upstream data. For a method embodiment for determining the second compensation duration and the processing duration, refer to the foregoing descriptions. Details are not described herein again. Because the processing duration is a preset fixed value, the first terminal can determine time at which the second terminal feeds back state information, to prevent an offset.

Further, as described above, preferably, duration of the first section is equal to duration of the second section. In this way, the second terminal sends the first state information only after a first packet sent by the first terminal arrives at the second terminal. Therefore, the first control information only needs to be constructed to arrive at the second terminal after the target one-way time. Because the target one-way time is equal to path duration, it may be ensured that a packet sent by the second terminal just falls at a start position of the second section. In this way, no conflict occurs in upstream of the packet sent by the first terminal and upstream of the packet sent by the second terminal. In addition, even if the first terminal sends the first control information at an end time point of the first section, the second terminal can still reply with the first state information at the end time point of the second section. In addition, the second section does not occupy extra time, and bandwidths of the first section and the second section can be used more efficiently.

Optionally, as described above, when the first terminal sends the first control information to the central office, a single-frame single-burst sending manner may be used, or a single-frame multi-burst sending manner may be used, and the central office also forwards a message to the second terminal based on a difference between the foregoing two manners. Therefore, based on different manners used by the first terminal to send the first control information, the second terminal also sends the first state information to the central office in a same manner. Details are as follows:

1. If the first terminal sends the first control information to the central office in the single-frame single-burst manner, after the target one-way time, the second terminal receives the first control information sent by the first terminal. Starting from time when the second terminal receives the first control information, the second terminal starts to send the first state information to the central office after the second compensation duration and the processing duration.

In this way, in one allocation period, the second terminal sends the first state information to the central office over only one second section (burst 2).

2. If the first terminal sends the first control information to the central office in the single-frame multi-burst manner, for example, the first terminal respectively sends four pieces of first control information to the central office over four first sections (bursts 1) in one allocation period, each piece of first control information arrives at the second terminal after the target one-way time. Starting from time when the second terminal receives current first control information, the second terminal starts to send corresponding first state information to the central office after the second compensation duration and the processing duration. In this way, in one allocation period, the second terminal also respectively sends four first state messages to the central office over four second sections (bursts 2).

In the foregoing manner, the second terminal replies with the first state information to the first terminal in a same manner as the first terminal. For a diagram of a sending process embodiment, refer to FIG. 6*a* to FIG. 7*b*. Details are not described herein again.

516: The central office sends the first state information to the first terminal.

In this embodiment, the central office obtains, based on the foregoing manner, the first state information sent by the second terminal, and in this case, the central office forwards the first state information to the first terminal. Because the central office is connected to different sites through different optical fibers, a conflict problem does not need to be considered in a process of downstream sending of the central office. The central office may directly send the first state information to the first terminal, so that the first terminal obtains a corresponding feedback message after sending the first control information.

517: The first terminal sends the first state information to the controller.

In this embodiment, the first terminal sends the first state information to the controller PLC, so that the PLC obtains the working state of the execution mechanism after sending the control information. In this way, optical bus communication in the method provided in this embodiment of this application is finally completed.

It should be noted that, the second terminal is a terminal having a high delay requirement. Therefore, the first terminal may communicate with the second terminal by using the method provided in this embodiment of this application, that is, the first terminal actively sends the first control information based on the first section allocated by the central office and a requirement of the controller. In an actual working process, the central office may be further connected to some terminals having low delay requirements, for example, a third terminal. If a same working manner is used on the third terminal, a waste of communication resources is caused. For the third terminal having the low delay requirement, a conventional manner may be used. Each time the first terminal needs to send third control information to the third terminal, the first terminal needs to request authorization from the central office, and then sends a message to the third terminal based on an allocation period currently authorized by the central office. Terminals having different delay requirements are distinguished in the foregoing two different manners, to save communication bandwidth resources. A working process is implemented in the following manner.

Figure 9:
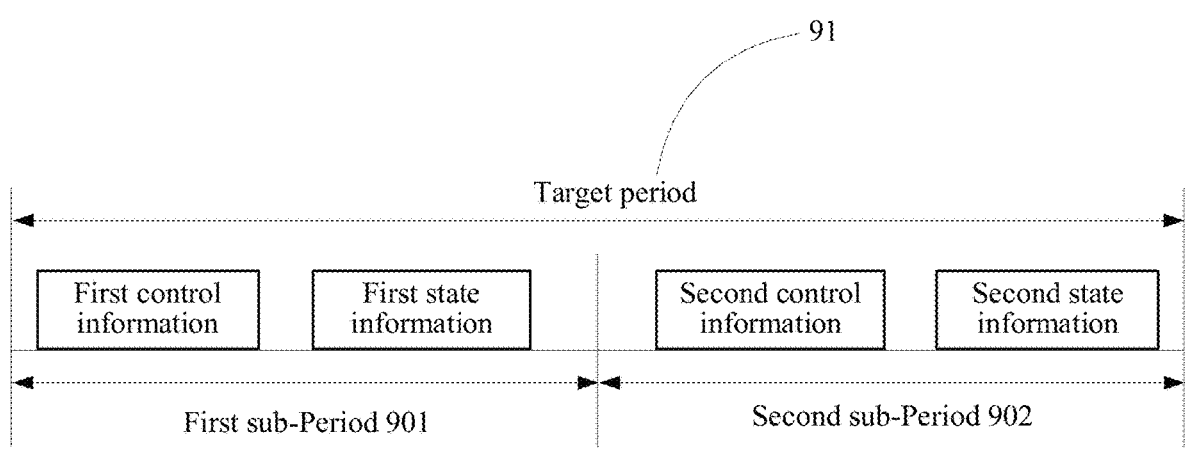
FIG. 9 is a diagram of another upstream sending manner of a first terminal in an optical bus communication method according to an embodiment of this application.

FIG. 9 shows a working manner in which a first terminal distinguishes a second terminal from a third terminal. As shown in FIG. 9, in a working process embodiment, the first terminal divides a target period 91 into two parts: a first sub-period 901 and a second sub-period 902, and performs the following steps based on the division of the target period.

1. The first terminal sends first control information to a central office in a first sub-period over a first section.

In this embodiment, the sending manner is an optical bus communication method provided in embodiments of this application. The first terminal determines, based on a requirement of a controller, whether to send an upstream message in the first section allocated by the central office. For an implementation, refer to the foregoing descriptions, and details are not described herein again.

2. The first terminal sends a target authorization request to the central office in a second sub-period.

In this embodiment, communication between the first terminal and the third terminal uses a conventional manner of communication between a terminal and a slave station. Each time the first terminal needs to send a message to the third terminal, the first terminal sends a target authorization request to the central office. The target authorization request is used to request the central office to authorize an upstream allocation period to the first terminal, and the target authorization request is a request generated by the first terminal based on second control information. In other words, each time the first terminal needs to send the second control information to the third terminal, the first terminal first generates a target authorization request, and the second control information is used to control the third terminal to work.

3. The central office determines a third section based on the target authorization request.

In this embodiment, the third section does not overlap with the first section and the second section, and the third section is a section in the second sub-period.

4. The central office sends the third section to the first terminal.

In this embodiment, the first terminal obtains the third section determined by the central office, including start time and duration of the third section, so that a sending occasion of the second control information can be determined based on the third section.

5. The first terminal sends the second control information to the central office over the third section.

In this embodiment, the first terminal sends the second control information to the central office over the third section, so that the central office sends the second control information to the third terminal. The second control information is used to control the third terminal to work, so that the third terminal replies with second state information, and the second state information is used to record a working state of an execution mechanism connected to the third terminal.

In this embodiment, in the manner shown in FIG. 9, the first terminal divides one target period into two segments, and one segment is used to send the first control information to the second terminal that has a high delay requirement, to obtain a lower delay and improve performance. The other segment is used to send the second control information to the third terminal that has a low delay requirement, and a conventional sending manner is used to obtain lower bandwidth consumption, to implement coexistence of terminals that have different delay requirements.

It should be noted that, to ensure normal operation of the optical bus communication system, it needs to be ensured that each device in the system can be normally powered on and run, to enter a working state. The following describes in detail a go-online manner of each device.

1. OLT Working State Machine.

In this embodiment, the OLT is a central office device, and the central office is connected to all subordinate terminal ONUs. Therefore, the central office needs to ensure that all the ONUs work normally. In the OLT working state machine, go-online manners of the ONU include: 1. conventional ONU go-online manner; and 2. dual-wavelength ONU go-online manner. For ease of understanding, the following describes the two cases in detail with reference to the accompanying drawings.

1. Conventional ONU go-Online Manner.

Figure 10:
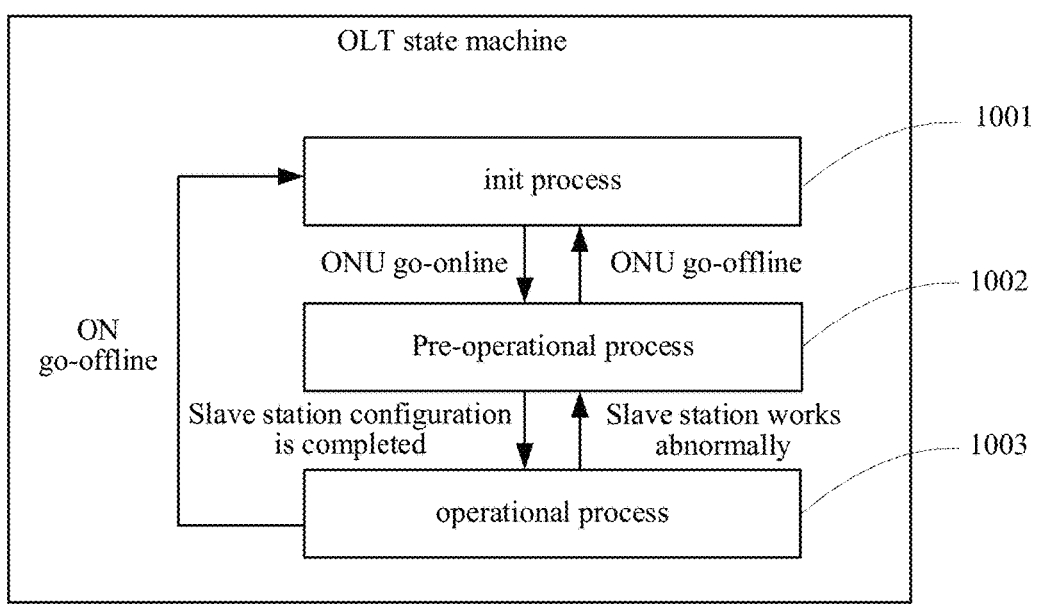
FIG. 10 is a diagram of a go-online manner of a terminal according to an embodiment of this application.

In this embodiment, that an ONU goes online in a conventional manner includes the following steps. It should be noted that, this step may be implemented using an OLT state machine. As shown in FIG. 10, the OLT state machine separately includes an init (initialization) process 1001, a pre-operational process 1002, and an operational process 1003.

(1) The ONU performs, in a PON manner, discovery, ranging, go-online, and allocation operations on an optical network unit management and control interface (OMCI) to manage a transmission container (tcont).

In this embodiment, persons skilled in the art may select, based on an actual need, a manner of performing discovery, ranging, go-online, and allocation operations on the OMCI to manage the tcont. This is not limited in this embodiment of this application. This step may be implemented by the init process 1001, to implement go-online and go-offline of the ONU.

(2) Send an ONU go-online result to a PLC controller.

In this embodiment, the PLC controller may learn, based on the ONU go-online result, that a current ONU has successfully gone online.

(3) The PLC controller notifies the OLT to enable support of authorization and a burst of a CAT manner.

In this embodiment, the PLC communicates with the OLT, so that the OLT can support a CAT communication manner in a subsequent communication process.

(4) The PLC controller configures the ONU.

In this embodiment, the PLC configures a go-online ONU, to complete configuration of the slave station. This step may be completed by the pre-operational processes 1003 and 1002.

(5) The PLC controller a field bus to operate.

In this embodiment, after all ONUs go online and complete configuration, the PLC starts the field bus to operate, so as to start the method provided in embodiments of this application. This step may be implemented by the operational process 1003.

In this embodiment, in the foregoing manner, all ONUs connected to the OLT can go online. However, the foregoing manner has a disadvantage that if a new ONU needs to be introduced to connect to the OLT, all ONUs need to go offline and go online again before continuing to work. Therefore, access of the new ONU causes another ONU to go offline. To resolve this problem, an embodiment of this application further provides a starting manner of a dual-wavelength manner. The following provides detailed descriptions.

2. A go-Online Manner of a Dual-Wavelength ONU.

Figure 11:
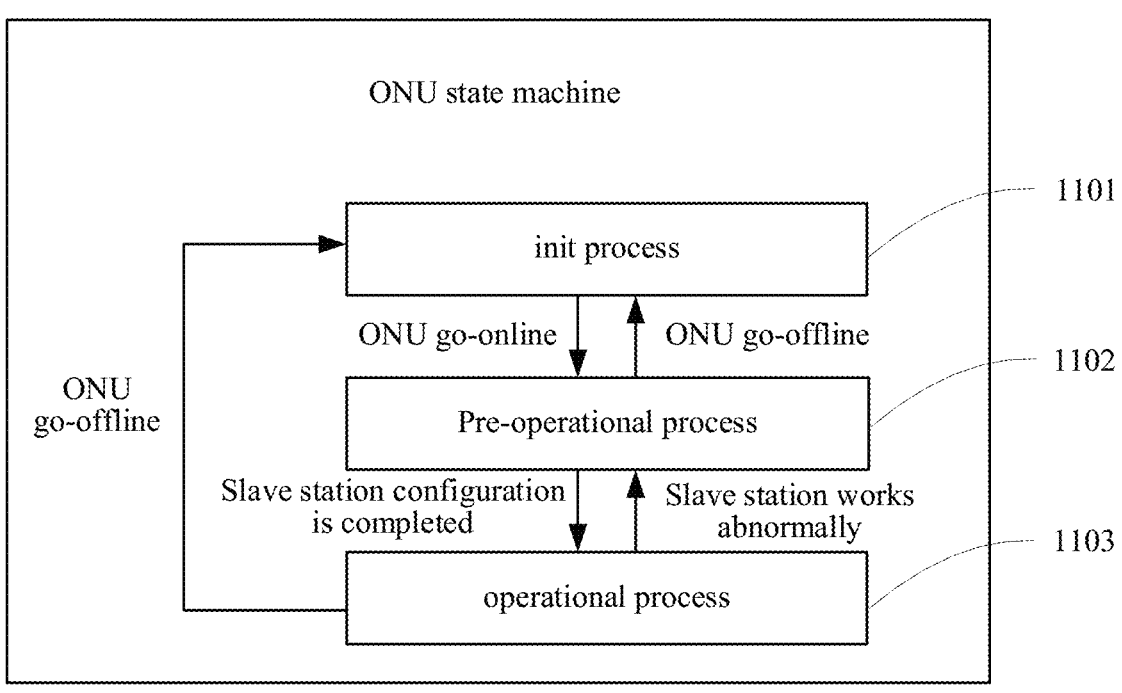
FIG. 11 is a diagram of another go-online manner of a terminal according to an embodiment of this application.

In this embodiment, as shown in FIG. 11, when the ONU initially goes online, the conventional go-online manner provided in the foregoing manner 1 may be used. After the ONU goes online, the ONU communicates with the OLT via an optical signal of a first wavelength. When the new ONU needs to access the OLT, the ONU newly accessing the OLT uses a second wavelength to communicate with the OLT and complete a step of going online. In this way, when the ONU newly accesses the OLT, another existing ONU does not need to go offline, and access of the new ONU can be completed.

A working manner of the working state machine of the OLT is described above. The following describes the go-online manner of the ONU.

2. ONU Working State Machine.

In this embodiment, the ONU working state machine of the ONU includes an init process 1101, a pre-operational process 1102, and an operational process 1103. The foregoing processes separately perform the following steps.

(1) The ONU performs, in the PON manner, discovery, ranging, go-online, and allocation operations on the OMCI to manage the tcont.

In this embodiment, persons skilled in the art may select, based on an actual need, a manner of performing discovery, ranging, go-online, and allocation operations on the OMCI to manage the tcont. This is not limited in this embodiment of this application. This step may be implemented by the init process 1101, to implement go-online and go-offline of the ONU.

(2) The OLT enables the ONU to support the authorization and the burst of the CAT manner.

In this embodiment, the OLT communicates with the ONU, so that the ONU can support a CAT communication manner in a subsequent communication process.

(3) The PLC controller configures the ONU.

In this embodiment, the PLC configures a go-online ONU, to complete configuration of the slave station. This step may be completed by the pre-operational process 1102.

(4) The ONU starts the field bus to operate.

In this embodiment, after all ONUS go online and complete configuration, the ONU starts the field bus to operate, to start the method provided in embodiments of this application. This step may be implemented by the operational process 1103.

In the foregoing working manner, the method provided in embodiments of this application can run normally. It should be noted that the optical bus communication method provided in embodiments of this application may be applied to working scenarios such as a gigabit-capable passive optical network (GPON), a 10-Gigabit-capable passive optical network (XGPON), a 10-Gigabit-capable symmetric passive optical network (XGSPON), a time and wavelength division multiplexing PON (TWDM PON), an Ethernet passive optical network (EPON), and a 10G Ethernet passive optical network (10G EPON). This is not limited in this embodiment of this application.

The optical bus communication method provided in embodiments of this application is applied to an optical bus communication system. The system includes a central office, a first terminal, and a second terminal, where the first terminal and the second terminal are separately connected to the central office, a controller is arranged on the first terminal, and the second terminal is connected to an execution mechanism. The method includes: The first terminal obtains first control information from the controller, where the first control information is generated by the controller and is used to control the execution mechanism to work. The first terminal sends the first control information to the central office over a first section, so that the central office forwards the first control information to the second terminal, where the second terminal is connected to the execution mechanism, and the first section is a section determined by the central office. The first terminal obtains first state information from the central office, where the first state information is used to record a working state of the execution mechanism, the first state information is information sent by the second terminal to the central office over a second section after the second terminal obtains the first control information, the second section is a section determined by the central office, and the first section does not overlap with the second section. The controller is arranged on the first terminal side, to implement flat access of the controller, and reduce redundancy of a system structure. In addition, upstream sending sections of the first terminal and the second terminal do not overlap, to avoid an upstream sending conflict caused by a structure change.

From the perspective of a hardware structure, the foregoing method may be implemented by a physical device, or may be jointly implemented by a plurality of physical devices, or may be implemented by a logical functional module in a physical device. This is not limited in embodiments of this application.

Figure 12:
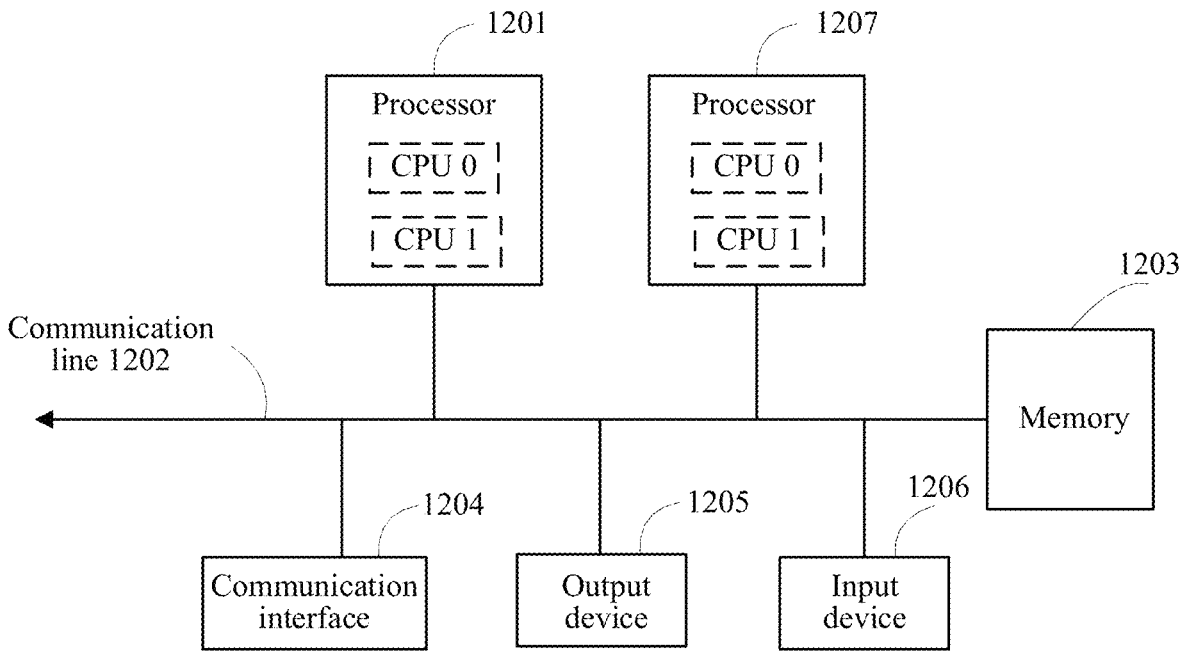
FIG. 12 is a diagram of an electronic device according to an embodiment of this application.

For example, the foregoing method may be implemented by using an electronic device in FIG. 12. FIG. 12 is a diagram of a hardware structure of the electronic device according to an embodiment of this application. The electronic device may be a playing terminal or a parsing terminal in embodiments of the present disclosure, and the electronic device includes at least one processor 1201, a communication line 1202, a memory 1203, and at least one communication interface 1204.

The processor 1201 may be a general-purpose central processing unit (CPU), a microprocessor, an application-specific integrated circuit (server IC), or one or more integrated circuits configured to control program execution of the solutions in this application.

The communication line 1202 may include a path for transferring information between the foregoing components.

The communication interface 1204 uses any apparatus such as a transceiver to communicate with another device or a communication network, such as an Ethernet, a radio access network (RAN), or a wireless local area network (WLAN).

The memory 1203 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be for carrying or storing expected program code in a form of instructions or a data structure and that can be accessed by a computer. However, the memory 1203 is not limited thereto. The memory may exist independently and is connected to the processor through the communication line 1202. The memory may alternatively be integrated with the processor.

The memory 1203 is configured to store computer-executable instructions for performing the solutions in this application, and execution of the computer-executable instructions is controlled by the processor 1201. The processor 1201 is configured to execute the computer-executable instructions stored in the memory 1203 to implement the optical bus communication method provided in the foregoing embodiments of this application.

Optionally, the computer-executable instructions in this embodiment of this application may also be referred to as application program code. This is not limited in embodiments of this application.

In an implementation, in an embodiment, the processor 1201 may include one or more CPUs such as a CPU 0 and a CPU 1 in FIG. 12.

In an implementation, in an embodiment, the electronic device may include a plurality of processors, for example, the processor 1201 and a processor 1207 in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

In an implementation, in an embodiment, the electronic device may further include an output device 1205 and an input device 1206. The output device 1205 communicates with the processor 1201, and may display information in a plurality of manners. For example, the output device 1205 may be a liquid crystal display (LCD), a light emitting diode (LED) display device, a cathode ray tube (CRT) display device, or a projector. The input device 1206 communicates with the processor 1201, and may receive an input of a user in a plurality of manners. For example, the input device 1206 may be a mouse, a keyboard, a touchscreen device, or a sensor device.

The electronic device may be a general-purpose device or a dedicated device. In an implementation, the electronic device may be a server, a wireless terminal device, an embedded device, or a device having a structure similar to that in FIG. 12. A type of the electronic device is not limited in this embodiment of this application.

In embodiments of this application, the electronic device may be divided into functional units based on the foregoing method example. For example, each functional unit may be obtained through division based on each corresponding function, or two or more functions may be integrated into one processing unit. The integrated unit may be implemented in a form of hardware, or may be implemented in a form of a software functional unit. It should be noted that, in this embodiment of this application, division into the units is an example, and is merely a logical function division. In actual implementation, another division manner may be used.

Figure 13:
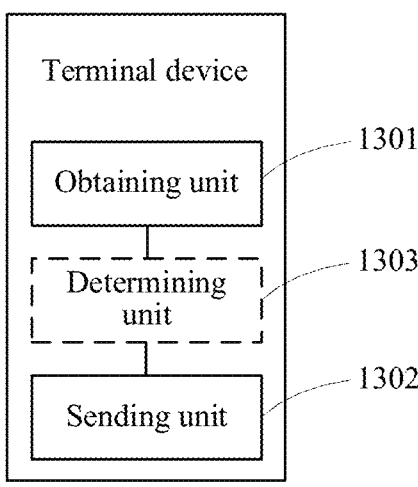
FIG. 13 is a diagram of a terminal device according to an embodiment of this application.

As shown in FIG. 13, a terminal device provided in an embodiment of this application includes:

an obtaining unit 1301, configured to obtain first control information from a controller, where the first control information is generated by the controller and is used to control an execution mechanism to work; and a sending unit 1302, configured to send the first control information obtained by the obtaining unit 1301 to a central office over a first section, so that the central office forwards the first control information to a second terminal, where the second terminal is connected to the execution mechanism.

The obtaining unit 1301 is further configured to obtain first state information from the central office, where the first state information is used to record a working state of the execution mechanism, the first state information is information sent by the second terminal to the central office over a second section after the second terminal obtains the first control information sent by the sending unit 1302, and the first section does not overlap with the second section.

Optionally, the obtaining unit 1301 is further configured to obtain first compensation duration from the central office, and the first compensation duration is duration obtained by performing ranging on the first terminal by the central office. The sending unit 1302 is further configured to:

send, for the first terminal after the first compensation duration, the first control information to the central office over the first section.

Optionally, the device further includes a determining unit 1303, configured to: determine start time and duration of the first section based on an indication of the central office, where the duration of the first section is determined by the central office based on a target section length, duration of the second section is greater than or equal to the duration of the first section, and the duration and start time of the second section are determined by the central office and sent to the second terminal. The target section length is equal to target one-way time of information from the first terminal to the second terminal, where the target one-way time includes at least one of forwarding duration of the first terminal, duration of upstream and downstream optical fiber transmission of the information between the first terminal, the second terminal, and the central office, forwarding duration of the central office, second compensation duration, and processing duration. The forwarding duration of the first terminal is duration of forwarding the first control information by the first terminal, and the forwarding duration of the central office is duration of forwarding information by the central office. The second compensation duration is duration obtained by performing ranging on the second terminal by the central office, and the processing duration is duration, determined by the central office, of processing a received downstream message by the second terminal.

Optionally, the sending unit 1302 is further configured to:

send the first control information to the central office over the first section in N sections in a target period, where the target period is an allocation period authorized by the central office to the first terminal, and N is a positive integer greater than or equal to 1.

Optionally, the target period includes a first sub-period and a second sub-period. The sending unit 1302 is further configured to:

send the first control information to the central office over the first section in the first sub-period.

The sending unit 1302 is further configured to:

send, for the first terminal, a target authorization request to the central office in the second sub-period, where the target authorization request is used to request the central office to authorize an upstream allocation section to the first terminal, the target authorization request is a request generated by the first terminal based on second control information, and the second control information is used to control a third terminal to work.

The obtaining unit 1301 is further configured to obtain a third section from the central office, and the third section is a section determined by the central office based on the target authorization request.

The sending unit 1302 is further configured to send the second control information to the central office over the third section, so that the central office sends the second control information to the third terminal.

Figure 14:
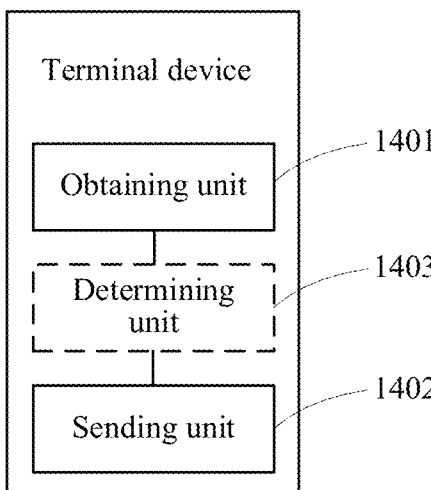
FIG. 14 is a diagram of another terminal device according to an embodiment of this application.

As shown in FIG. 14, another terminal device provided in an embodiment of this application includes:

an obtaining unit 1401, configured to obtain first control information from a central office, where the first control information is generated by a controller, the first control information is information sent by a first terminal to the central office over a first section, and the first terminal is connected to the controller; and a sending unit 1402, configured to send the first control information obtained by the obtaining unit 1401 to an execution mechanism, so that the execution mechanism works under control of the first control information.

The sending unit 1402 is further configured to send first state information to the central office over a second section, where the first state information is used to record a working state of the execution mechanism, and the first section does not overlap with the second section.

Optionally, the obtaining unit 1401 is further configured to obtain second compensation duration and processing duration from the central office, where the second compensation duration is duration obtained by performing ranging on the second terminal by the central office, and the processing duration is duration, determined by the central office, of processing a received downstream message by the second terminal. The sending unit 1402 is further configured to:

send the first state information to the central office after the second compensation duration and the processing duration when the second terminal obtains the first control information.

Optionally, the device further includes a determining unit 1403, configured to determine start time and duration of the second section based on an indication of the central office, where the duration of the second section is determined by the central office based on a target section length, duration of the second section is greater than or equal to the duration of the first section, and the duration and start time of the first section are determined by the central office and sent to the first terminal. The target section length is equal to target one-way time of information from the first terminal to the second terminal, where the target one-way time includes at least one of forwarding duration of the first terminal, duration of upstream and downstream optical fiber transmission of the information between the first terminal, the second terminal, and the central office, forwarding duration of the central office, second compensation duration, and processing duration. The forwarding duration of the first terminal is duration of forwarding the first control information by the first terminal, and the forwarding duration of the central office is duration of forwarding information by the central office. The second compensation duration is duration obtained by performing ranging on the second terminal by the central office, and the processing duration is duration, determined by the central office, of processing a received downstream message by the second terminal.

Figure 15:
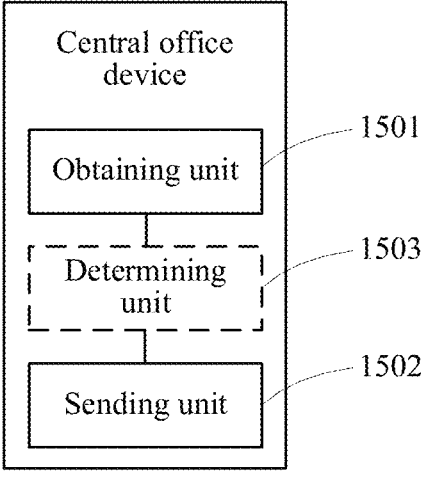
FIG. 15 is a diagram of a central office device according to an embodiment of this application.

As shown in FIG. 15, a central office device provided in an embodiment of this application includes:

an obtaining unit 1501, configured to obtain first control information from a first terminal over a first section, where the first control information is generated by a controller and is used to control an execution mechanism to work, and the first terminal is connected to the controller; and a sending unit 1502, configured to send the first control information obtained by the obtaining unit 1501 to a second device, where the second device is connected to the execution mechanism, to enable the second device to send the first control information to the execution mechanism.

The obtaining unit 1501 is further configured to obtain first state information from the second terminal over a second section, where the first state information is used to record a working state of the execution mechanism, and the first section does not overlap with the second section.

The sending unit 1502 is further configured to send the first state information to the first terminal.

Optionally, the apparatus further includes a determining unit 1503, configured to obtain first compensation duration based on a ranging result of the first terminal.

The sending unit 1502 is further configured to send the first compensation duration to the first terminal, to enable the first terminal to determine, based on the first compensation duration, a time point of sending the first control information to the central office.

The determining unit 1503 is further configured to obtain second compensation duration based on a ranging result of the second terminal.

The determining unit 1503 is further configured to determine processing duration of processing a received downstream message by the second terminal.

The sending unit 1502 is further configured to send the second compensation duration and the processing duration to the first terminal, to enable the second terminal to send, when obtaining the first control information, the first state information to the central office after the second compensation duration and the processing duration.

Optionally, the determining unit 1503 is further configured to: determine a target section length based on target one-way time of information from the first terminal to the second terminal, where the target section length is equal to the target one-way time;

determine start time and duration of the first section, where the duration of the first section is equal to the target one-way time determined by the determining unit 1503; and determine start time and duration of the second section, where the duration of the second section is greater than or equal to the target one-way time determined by the determining unit 1503.

The sending unit 1502 is further configured to:

send first parameter information to the first terminal, where the first parameter information indicates the start time and the duration of the first section; and send second parameter information to the second terminal, where the second parameter information indicates the start time and the duration of the second section.

Optionally, the obtaining unit 1501 is further configured to: obtain, from the first terminal, forwarding duration of the first terminal and duration of upstream and downstream optical fiber transmission of information between the first terminal and the central office, where the forwarding duration of the first terminal is duration of forwarding the first control information by the first terminal; and obtain, from the second terminal, duration of upstream and downstream optical fiber transmission of information between the second terminal and the central office.

The determining unit 1503 is further configured to determine the target section length based on at least one of the forwarding duration of the first terminal, the duration of upstream and downstream optical fiber transmission of the information between the first terminal, the second terminal, and the central office, the forwarding duration of the central office, the second compensation duration, and the processing duration, where the forwarding duration of the central office is duration of forwarding the information by the central office.

All or some of the foregoing embodiments may be implemented using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, all or a part of the procedures or functions according to embodiments of the present disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed communication method, relay device, donor evolved NodeB, and computer storage medium may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic, a mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a read-only memory (ROM), a random access memory (RAM), a magnetic disk, or an optical disc.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A first terminal, the first terminal comprising:
a memory storing instructions; and
at least one processor in communication with the memory, the at least one processor configured, upon execution of the instructions, to perform the following steps:
obtaining a first control information from a controller, the first control information being generated by the controller, the first control information being used to control an execution mechanism to work;
obtaining a first compensation duration from the central office, the first compensation duration being obtained by performing ranging on the first terminal by the central office;
sending, after the first compensation duration, the first control information to a central office over a first section, the central office forwarding the first control information to a second terminal, the second terminal being connected to the execution mechanism; and
obtaining a first state information from the central office, the first state information being used to record a working state of the execution mechanism, the first state information is sent by the second terminal to the central office over a second section after the second terminal obtains the first control information, and the first section does not overlap with the second section.

2. The first terminal according to claim 1, the at least one processor further executing the instructions to perform the step of:
determining a start time and duration of the first section based on an indication of the central office, wherein the duration of the first section is determined by the central office based on a target section length, a duration of the second section is greater than or equal to the duration of the first section, and the duration and start time of the second section are determined by the central office and sent to the second terminal;
the target section length is equal to a target one-way time of information from the first terminal to the second terminal, wherein the target one-way time comprises at least one of a forwarding duration of the first terminal, a duration of upstream and downstream optical fiber transmission of the information between the first terminal, the second terminal, and the central office, a forwarding duration of the central office, a second compensation duration, or a processing duration; and
the forwarding duration of the first terminal is a duration of forwarding the first control information by the first terminal, the forwarding duration of the central office is a duration of forwarding information by the central office, the second compensation duration is a duration obtained by performing ranging on the second terminal by the central office, and the processing duration is a duration determined by the central office of processing a received downstream message by the second terminal.

3. The first terminal according to claim 1, the at least one processor further executing the instructions to perform the step of:
sending the first control information to the central office over the first section in N sections in a target period, wherein the target period is an allocation period authorized by the central office to the first terminal, and N is a positive integer greater than or equal to 1.

4. The first terminal according to claim 3, wherein the target period comprises a first sub-period and a second sub-period, and the at least one processor further executing the instructions to perform the step of:
sending the first control information to the central office over the first section in the first sub-period;
sending a target authorization request to the central office in the second sub-period, wherein the target authorization request requests the central office to authorize an upstream allocation section to the first terminal, the target authorization request is generated by the first terminal based on second control information, and the second control information is used to control a third terminal to work;
obtaining a third section from the central office, wherein the third section is a section determined by the central office based on the target authorization request; and
sending the second control information to the central office over the third section so that the central office sends the second control information to the third terminal.

5. A second terminal, the second terminal comprising:
a memory storing instructions; and
at least one processor in communication with the memory, the at least one processor configured, upon execution of the instructions, to perform the following steps:
obtaining a second compensation duration and a processing duration from a central office, the second compensation duration being obtained by performing ranging on the second terminal by the central office, and the processing duration is determined by the central office in processing a received downstream message by the second terminal; and
obtaining first control information from the central office, the first control information being generated by a controller, the first control information being sent by a first terminal to the central office over a first section, and the first terminal is connected to the controller;
sending the first control information to an execution mechanism, so that the execution mechanism works under control of the first control information; and
sending first state information to the central office over a second section and after the second compensation duration and the processing duration when obtaining the first control information, the first state information being used to record a working state of the execution mechanism, and the first section does not overlap with the second section.

6. The second terminal according to claim 5, the at least one processor further executing the instructions to perform the steps of:

determining a start time and duration of the second section based on an indication of the central office, the duration of the second section being determined by the central office based on a target section length, the duration of the second section being greater than or equal to the duration of the first section, and the duration and start time of the first section are determined by the central office and sent to the first terminal;

the target section length is equal to a target one-way time of information from the first terminal to the second terminal, wherein the target one-way time comprises at least one of a forwarding duration of the first terminal, a duration of upstream and downstream optical fiber transmission of the information between the first terminal, the second terminal, and the central office, a forwarding duration of the central office, a second compensation duration, or a processing duration; and the forwarding duration of the first terminal is a duration of forwarding the first control information by the first terminal, the forwarding duration of the central office is a duration of forwarding information by the central office, the second compensation duration is a duration obtained by performing ranging on the second terminal by the central office, and the processing duration is a duration determined by the central office of processing a received downstream message by the second terminal.

7. A central office, the central office comprising:

a memory storing instructions; and at least one processor in communication with the memory, the at least one processor configured, upon execution of the instructions, to perform the following steps:

obtaining a first control information from a first terminal over a first section, the first control information being generated by a controller and the first control information being used to control an execution mechanism to work, the first terminal being connected to the controller;

obtaining a first compensation duration from the central office, the first compensation duration being obtained by performing ranging on the first terminal by the central office;

sending, after the first compensation duration, the first control information to a second device, the second device being connected to the execution mechanism to enable the second device to send the first control information to the execution mechanism;

obtaining a first state information from a second terminal over a second section, the first state information being used to record a working state of the execution mechanism, and the first section does not overlap with the second section; and sending the first state information to the first terminal.

8. The central office according to claim 7, the at least one processor further executing the instructions to perform the steps of:

obtaining a first compensation duration based on a ranging result of the first terminal;

sending the first compensation duration to the first terminal to enable the first terminal to determine, based on the first compensation duration, a time point of sending the first control information to the central office;

obtaining a second compensation duration based on a ranging result of the second terminal;

determining a processing duration of processing a received downstream message by the second terminal; and sending the second compensation duration and the processing duration to the first terminal to enable the second terminal to send, when obtaining the first control information, the first state information to the central office after the second compensation duration and the processing duration.

9. The central office according to claim 8, the at least one processor further executing the instructions to perform the steps of:

determining a target section length based on a target one-way time of information from the first terminal to the second terminal, wherein the target section length is equal to the target one-way time;

determining a start time and duration of the first section, wherein the duration of the first section is equal to the target one-way time;

determining a start time and duration of the second section, wherein the duration of the second section is greater than or equal to the target one-way time;

sending a first parameter information to the first terminal, wherein the first parameter information indicates the start time and the duration of the first section; and sending a second parameter information to the second terminal, wherein the second parameter information indicates the start time and the duration of the second section.

10. The central office according to claim 9, the at least one processor further executing the instructions to perform the steps of:

obtaining from the first terminal by the central office, a forwarding duration of the first terminal and a duration of upstream and downstream optical fiber transmission of information between the first terminal and the central office, wherein the forwarding duration of the first terminal is a duration of forwarding the first control information by the first terminal; and obtaining from the second terminal by the central office, a duration of upstream and downstream optical fiber transmission of information between the second terminal and the central office; and determining by the central office, the target section length based on at least one of the forwarding duration of the first terminal, the duration of upstream and downstream optical fiber transmission of the information between the first terminal, the second terminal, and the central office, the forwarding duration of the central office, the second compensation duration, and the processing duration, wherein the forwarding duration of the central office is a duration of forwarding the information by the central office.

\* \* \* \* \*